(12) United States Patent
Ishii et al.

(10) Patent No.: US 9,106,906 B2
(45) Date of Patent: Aug. 11, 2015

(54) IMAGE GENERATION SYSTEM, IMAGE GENERATION METHOD, AND INFORMATION STORAGE MEDIUM

(75) Inventors: Motonaga Ishii, Yokohama (JP); Takashi Imagire, Tokyo (JP)

(73) Assignee: BANDAI NAMCO GAMES INC., Tokyo (JP)

( * ) Notice: Subject to any disclaimer, the term of this patent is extended or adjusted under 35 U.S.C. 154(b) by 499 days.

(21) Appl. No.: 13/227,121

(22) Filed: Sep. 7, 2011

(65) Prior Publication Data

US 2012/0056885 A1    Mar. 8, 2012

(30) Foreign Application Priority Data

Sep. 8, 2010   (JP) ................................. 2010-200534
Aug. 3, 2011   (JP) ................................. 2011-170080

(51) Int. Cl.
*H04N 13/00*   (2006.01)
*H04N 13/04*   (2006.01)
*H04N 13/02*   (2006.01)

(52) U.S. Cl.
CPC ....... *H04N 13/0429* (2013.01); *H04N 13/0018* (2013.01); *H04N 13/0278* (2013.01); *H04N 13/0402* (2013.01); *H04N 13/0468* (2013.01); *H04N 13/0404* (2013.01); *H04N 13/0409* (2013.01); *H04N 13/0431* (2013.01); *H04N 13/0434* (2013.01); *H04N 13/0438* (2013.01); *H04N 2213/008* (2013.01)

(58) Field of Classification Search
USPC ...................................................... 375/42–60
See application file for complete search history.

(56) References Cited

U.S. PATENT DOCUMENTS

| | | | | |
|---|---|---|---|---|
| 7,027,659 | B1* | 4/2006 | Thomas | 382/254 |
| 7,301,510 | B2* | 11/2007 | Hewitt et al. | 345/9 |
| 7,321,682 | B2 | 1/2008 | Tooyama et al. | |
| 7,596,259 | B2 | 9/2009 | Tooyama et al. | |
| 2002/0105576 | A1* | 8/2002 | Miyazawa et al. | 348/43 |
| 2004/0066555 | A1 | 4/2004 | Nomura | |
| 2007/0115279 | A1* | 5/2007 | Imagire | 345/419 |
| 2007/0285774 | A1* | 12/2007 | Merrirt et al. | 359/465 |
| 2008/0231691 | A1* | 9/2008 | Larson | 348/56 |
| 2009/0002483 | A1* | 1/2009 | Yanagawa et al. | 348/46 |
| 2010/0074594 | A1* | 3/2010 | Nakamura et al. | 386/92 |

(Continued)

FOREIGN PATENT DOCUMENTS

| | | |
|---|---|---|
| JP | A-2001-218977 | 8/2001 |
| JP | A-2004-126902 | 4/2004 |
| JP | A-2004-178581 | 6/2004 |

*Primary Examiner* — Jeremiah Hallenbeck-Huber
*Assistant Examiner* — Samuel D Fereja
(74) *Attorney, Agent, or Firm* — Oliff PLC

(57) ABSTRACT

An image generation system includes an object space setting section that sets an object space in which a plurality of objects are disposed, and an image generation section that generates a first-viewpoint image viewed from a first viewpoint in the object space, and a second-viewpoint image viewed from a second viewpoint in the object space, the first viewpoint and the second viewpoint implementing stereovision. The image generation section performs a drawing process to generate the first-viewpoint image and the second-viewpoint image, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint.

21 Claims, 22 Drawing Sheets

(56) References Cited

U.S. PATENT DOCUMENTS

| | | | |
|---|---|---|---|
| 2010/0091097 A1* | 4/2010 | Pockett | 348/54 |
| 2010/0277575 A1* | 11/2010 | Ismael et al. | 348/53 |
| 2011/0157328 A1* | 6/2011 | Ishiyama et al. | 348/51 |
| 2011/0205341 A1* | 8/2011 | Wilson et al. | 348/51 |

* cited by examiner

FIG. 8
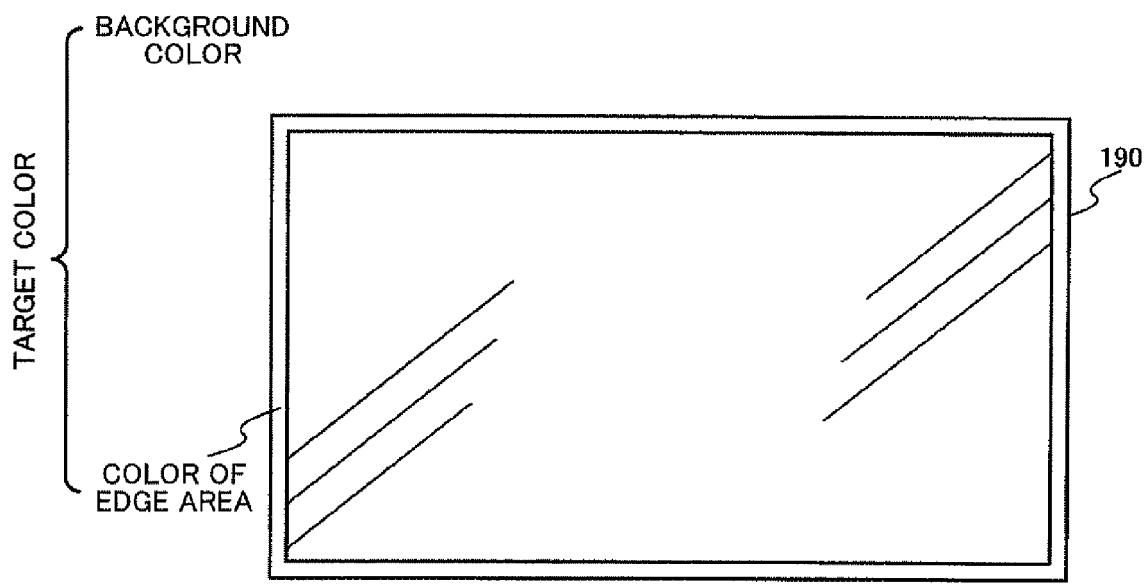
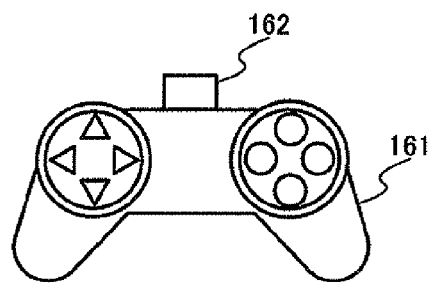

IMAGE GENERATION SYSTEM, IMAGE GENERATION METHOD, AND INFORMATION STORAGE MEDIUM

Japanese Patent Application No. 2010-200534 filed on Sep. 8, 2010 and Japanese Patent Application No. 2011-170080 filed on Aug. 3, 2011, are hereby incorporated by reference in their entirety.

BACKGROUND

The present invention relates to an image generation system, an image generation method, an information storage medium, and the like.

In the fields of movies, games, and the like, a stereoscopic image generation/display system has attracted attention as a system that generates/displays a more realistic image. For example, a binocular stereoscopic image generation/display system generates/displays a left-eye image and a right-eye image. The player who wears stereoscopic glasses observes the left-eye image with the left eye, and observes the right-eye image with the right eye, so that stereovision is implemented. For example, JP-A-2004-126902 discloses a related-art image generation/display system that implements stereovision.

When generating such a stereoscopic image by means of computer graphics (CG), a left-eye view volume (left-eye view frustum) corresponding to a left-eye virtual camera is set as the field of view, and a drawing process is performed to generate a left-eye image. A right-eye view volume (right-eye view frustum) corresponding to a right-eye virtual camera is also set as the field of view, and a drawing process is performed to generate a right-eye image.

However, an object present within the left-eye view volume may not be present within the right-eye view volume, or an object present within the right-eye view volume may not be present within the left-eye view volume. Specifically, a frame violation (window violation) may occur. Therefore, a situation in which the player can observe an object positioned around the clipping plane of the view volume with only the right eye or the left eye may occur, so that the player may be given a wrong impression.

SUMMARY

According to one aspect of the invention, there is provided an image generation system comprising:

an object space setting section that sets an object space in which a plurality of objects are disposed; and an image generation section that generates a first-viewpoint image viewed from a first viewpoint in the object space, and a second-viewpoint image viewed from a second viewpoint in the object space, the first viewpoint and the second viewpoint implementing stereovision, the image generation section performing a drawing process to generate the first-viewpoint image and the second-viewpoint image, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint.

According to another aspect of the invention, there is provided an image generation system comprising:

an object space setting section that sets an object space in which a plurality of objects are disposed; and an image generation section that generates a first-viewpoint image viewed from a first viewpoint in the object space, and a second-viewpoint image viewed from a second viewpoint in the object space, the first viewpoint and the second viewpoint implementing stereovision, the image generation section performing a drawing process to generate the first-viewpoint image and the second-viewpoint image, the drawing process changing a display state of an object as a distance from a right/left side of a screen decreases, the object being perspectively projected onto the screen.

According to another aspect of the invention, there is provided an image generation method comprising:

setting an object space in which a plurality of objects are disposed;

generating a first-viewpoint image viewed from a first viewpoint in the object space, and a second-viewpoint image viewed from a second viewpoint in the object space, the first viewpoint and the second viewpoint implementing stereovision; and performing a drawing process to generate the first-viewpoint image and the second-viewpoint image, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint.

According to another aspect of the invention, there is provided an image generation method comprising:

setting an object space in which a plurality of objects are disposed;

generating a first-viewpoint image viewed from a first viewpoint in the object space, and a second-viewpoint image viewed from a second viewpoint in the object space, the first viewpoint and the second viewpoint implementing stereovision; and performing a drawing process to generate the first-viewpoint image and the second-viewpoint image, the drawing process changing a display state of an object as a distance from a right/left side of a screen decreases, the object being perspectively projected onto the screen.

According to another aspect of the invention, there is provided a computer-readable information storage medium storing a program that causes a computer to execute the above image generation method.

BRIEF DESCRIPTION OF THE DRAWINGS

FIG. 8 is a view illustrative of a target color acquisition method.

FIG. 21 is a view illustrative of a viewpoint selection method when implementing multi-view stereovision or the like.

FIG. 22 is a view illustrative of a viewpoint selection method when implementing multi-view stereovision or the like.

DESCRIPTION OF EXEMPLARY EMBODIMENTS

Figure 1:
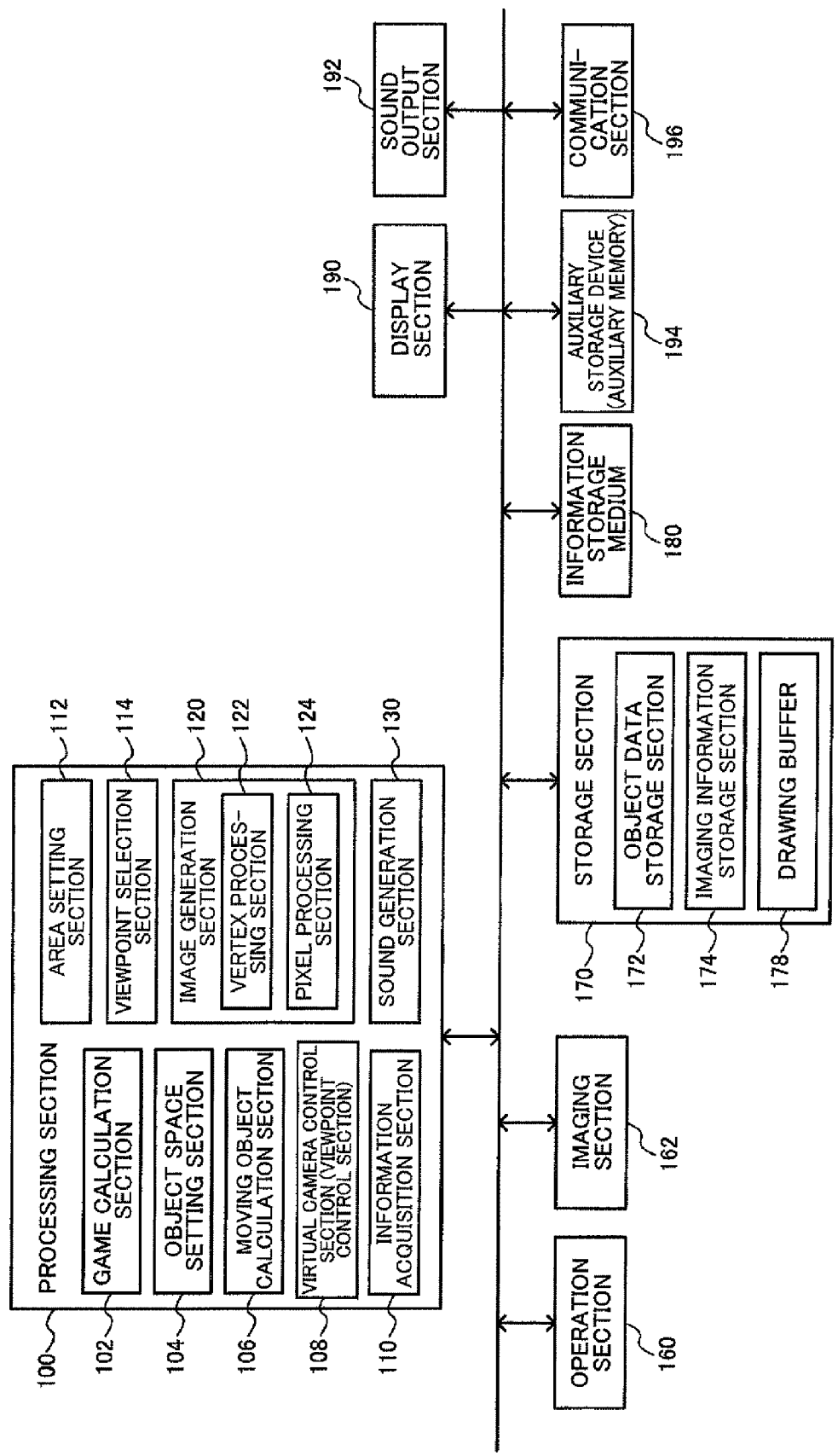
FIG. 1 shows a configuration example of an image generation system according to one embodiment of the invention.

Several aspects of the invention may provide an image generation system, an image generation method, an information storage medium, and the like that can suppress a situation in which the player is given a wrong impression (i.e., can reduce inconsistency) when implementing stereovision.

According to one embodiment of the invention, there is provided an image generation system comprising:

an object space setting section that sets an object space in which a plurality of objects are disposed; and an image generation section that generates a first-viewpoint image viewed from a first viewpoint in the object space, and a second-viewpoint image viewed from a second viewpoint in the object space, the first viewpoint and the second viewpoint implementing stereovision, the image generation section performing a drawing process to generate the first-viewpoint image and the second-viewpoint image, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint.

According to the image generation system, the first-viewpoint image viewed from the first viewpoint in the object space and the second-viewpoint image viewed from the second viewpoint in the object space are generated to implement stereovision. The first-viewpoint image and the second-viewpoint image are generated so that the display state of the object changes in a direction from the inner drawing area within the common area of the first-viewpoint view volume and the second-viewpoint view volume toward an area outside the inner drawing area. This makes it possible to reduce the difference in the image of the object in an area around the right/left side of the screen, for example, and suppress a situation in which the player is given a wrong impression when implementing stereovision.

In the image generation system, the image generation section may perform the drawing process that causes the object to gradually become completely or almost transparent in a direction from the inner drawing area toward an area outside the inner drawing area to generate the first-viewpoint image and the second-viewpoint image.

According to the above feature, the first-viewpoint image and the second-viewpoint image are generated so that the object gradually becomes completely or almost transparent in a direction from the inner drawing area toward an area outside the inner drawing area. This makes it possible to provide a more natural stereoscopic image.

In the image generation system, the image generation section may perform the drawing process that causes the object to be gradually defocused in a direction from the inner drawing area toward an area outside the inner drawing area to generate the first-viewpoint image and the second-viewpoint image.

According to the above feature, the first-viewpoint image and the second-viewpoint image are generated so that the object is gradually defocused in a direction from the inner drawing area toward an area outside the inner drawing area. This makes it possible to provide a stereoscopic image with reduced inconsistency.

In the image generation system, the image generation section may perform the drawing process that causes a color of the object to gradually approach a target color in a direction from the inner drawing area toward an area outside the inner drawing area to generate the first-viewpoint image and the second-viewpoint image.

According to the above feature, the first-viewpoint image and the second-viewpoint image are generated so that the color of the object gradually approaches the target color in a direction from the inner drawing area toward an area outside the inner drawing area. This makes it possible to provide a stereoscopic image with reduced inconsistency.

The image generation system may further comprise:

an information acquisition section that acquires color information about an area around a screen of a display section when viewed from a player, an image being displayed on the screen of the display section, the image generation section may set the target color based on the acquired color information.

This makes it possible to eliminate the presence of the screen of the display section, and implement optical camouflage image representation.

In the image generation system, the image generation section may perform the drawing process that gradually changes the display state of the object from the inner drawing area within the common area toward a clipping plane of the common area to generate the first-viewpoint image and the second-viewpoint image.

According to the above feature, the first-viewpoint image and the second-viewpoint image are generated so that the display state of the object gradually changes as the distance from the clipping plane of the common area decreases. Therefore, a more natural stereoscopic image can be provided even if the object is clipped by the clipping plane within one of the view volumes, for example.

In the image generation system, the image generation section may obtain a first-viewpoint vertex screen position that is a position of a vertex of the object on a screen within the first-viewpoint view volume, may obtain a second-viewpoint vertex screen position that is a position of the vertex of the object on the screen within the second-viewpoint view volume, and may perform the drawing process that changes the display state of the object based on the first-viewpoint vertex screen position and the second-viewpoint vertex screen position to generate the first-viewpoint image and the second-viewpoint image.

This makes it possible to implement the drawing process that changes the display state of the object in a direction from the inner drawing area toward an area outside the inner drawing area by the vertex process that obtains the first-viewpoint vertex screen position and the second-viewpoint vertex screen position.

In the image generation system, the image generation section may obtain a first $\alpha$-value that is set corresponding to a distance between the first-viewpoint vertex screen position and a right/left side of the screen, may obtain a second $\alpha$-value that is set corresponding to a distance between the second-viewpoint vertex screen position and the right/left side of the screen, may set an $\alpha$-value of the vertex of the object based on the first $\alpha$-value and the second $\alpha$-value, and may generate the first-viewpoint image and the second-viewpoint image.

This makes it possible to implement the drawing process that changes the display state of the object in a direction from the inner drawing area toward an area outside the inner drawing area by setting the $\alpha$-value of the vertex of the object using the first $\alpha$-value determined by the first-viewpoint vertex screen position and the second $\alpha$-value determined by the second-viewpoint vertex screen position.

The image generation system may further comprise:

an area setting section that sets the inner drawing area within the common area of the first-viewpoint view volume and the second-viewpoint view volume, the area setting section may change a shape of the inner drawing area according to a change in shape of the common area.

This makes it possible to deal with a situation in which the shape of the common area of the view volumes has changed due to a change in position and direction of the first-viewpoint view volume or the second-viewpoint view volume by changing the shape of the inner drawing area.

In the image generation system, the area setting section may change the shape of the inner drawing area formed by a free-form surface using a vertex of the common area as a control point.

This makes it possible to change the shape of the inner drawing area corresponding to a change in the shape of the common area by effectively utilizing the free-form surface method.

The image generation system may further comprise:

an information acquisition section that acquires position information about a left eye and a right eye of a player; and
a viewpoint control section, the viewpoint control section may set the first-viewpoint view volume and the second-viewpoint view volume based on the acquired position information.

According to the above feature, the position and the direction of the first-viewpoint view volume and the second-viewpoint view volume change corresponding to the positions of the left eye and the right eye of the player. This makes it possible to implement image representation in which the above process is synchronized with the movement of the player.

In the image generation system, a left-eye marker corresponding to the left eye of the player and a right-eye marker corresponding to the right eye of the player may be provided to a recognition member worn by the player, and the information acquisition section may acquire the position information about the left eye and the right eye of the player based on imaging information from an imaging section that images the recognition member worn by the player.

According to the above feature, the position information about the left eye and the right eye of the player can be easily acquired by merely providing the left-eye marker and the right-eye marker to the recognition member.

In the image generation system, the information acquisition section may acquire distance information about a distance between the left eye and the right eye of the player, and the viewpoint control section may set an inter-viewpoint distance between the first viewpoint and the second viewpoint based on the acquired distance information, and may set the first-viewpoint view volume and the second-viewpoint view volume.

According to the above feature, the inter-viewpoint distance between the first viewpoint and the second viewpoint can be set corresponding to the distance information about the distance between the left eye and the right eye of the player. This makes it possible to provide a stereoscopic image that reflects an individual variation in the eye-to-eye distance (inter-pupil distance) of the player.

In the image generation system, the recognition member may be glasses having an adjustment mechanism for adjusting a distance between a left-eye part and a right-eye part, and the information acquisition section may acquire the distance information about the distance between the left eye and the right eye of the player based on imaging information about a left-eye marker provided to the left-eye part of the glasses and a right-eye marker provided to the right-eye part of the glasses.

According to the above feature, the distance information about the distance between the left eye and the right eye of the player can be acquired, and the inter-viewpoint distance between the first viewpoint and the second viewpoint can be set by merely allowing the player to make an adjustment using the adjustment mechanism of the glasses (recognition member).

According to another embodiment of the invention, there is provided an image generation system comprising:

an object space setting section that sets an object space in which a plurality of objects are disposed; and an image generation section that generates a first-viewpoint image viewed from a first viewpoint in the object space, and a second-viewpoint image viewed from a second viewpoint in the object space, the first viewpoint and the second viewpoint implementing stereovision, the image generation section performing a drawing process to generate the first-viewpoint image and the second-viewpoint image, the drawing process changing a display state of an object as a distance from a right/left side of a screen decreases, the object being perspectively projected onto the screen.

According to the image generation system, the first-viewpoint image and the second-viewpoint image are generated so that the display state of the object changes as the distance from the right/left side of the screen decreases. This makes it possible to reduce the difference in the image of the object in an area around the right/left side of the screen, for example, and suppress a situation in which the player is given a wrong impression when implementing stereovision.

In the image generation system, the image generation section may obtain a first-viewpoint vertex screen position that is a position of a vertex of the object on the screen within a first-viewpoint view volume corresponding to the first viewpoint, may obtain a second-viewpoint vertex screen position that is a position of the vertex of the object on the screen within a second-viewpoint view volume corresponding to the second viewpoint, and may perform the drawing process that changes the display state of the object based on the first-viewpoint vertex screen position and the second-viewpoint vertex screen position to generate the first-viewpoint image and the second-viewpoint image.

In the image generation system, the first viewpoint and the second viewpoint respectively may be a viewpoint of a left-eye virtual camera and a viewpoint of a right-eye virtual camera that implement binocular stereovision.

In the image generation system, the first viewpoint and the second viewpoint may be two viewpoints among a plurality of viewpoints that implement multi-view stereovision, or two arbitrary viewpoints within an observation range that is set to implement integral imaging stereovision.

When implementing integral imaging stereovision, a specific viewpoint may not be set during drawing, but a representative observation position is set. Therefore, the positions of the eyes of the player based on the representative observation position may be used as the first viewpoint and the second viewpoint, for example. Alternatively, positions corresponding to the ends of the observation range may be used as the first viewpoint and the second viewpoint.

The image generation system may further comprise:

an information acquisition section that acquires positional relationship information about a screen of a display section and a player; and a viewpoint selection section that selects the first viewpoint and the second viewpoint that implement the multi-view stereovision or the integral imaging stereovision based on the acquired positional relationship information.

According to the above feature, the first-viewpoint image and the second-viewpoint image can be generated so that the display state of the object changes in a direction from the inner drawing area within the common area of the first-viewpoint view volume and the second-viewpoint view volume selected based on the positional relationship information about the screen and the player toward an area outside the inner drawing area. This makes it possible to suppress a situation in which the player is given a wrong impression (i.e., reduce inconsistency) when implementing stereovision, and implement stereoscopic display appropriate for multi-view stereovision or integral imaging stereovision.

According to another embodiment of the invention, there is provided an image generation method comprising:

setting an object space in which a plurality of objects are disposed;

generating a first-viewpoint image viewed from a first viewpoint in the object space, and a second-viewpoint image viewed from a second viewpoint in the object space, the first viewpoint and the second viewpoint implementing stereovision; and performing a drawing process to generate the first-viewpoint image and the second-viewpoint image, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint.

According to another embodiment of the invention, there is provided an image generation method comprising:

setting an object space in which a plurality of objects are disposed;

generating a first-viewpoint image viewed from a first viewpoint in the object space, and a second-viewpoint image viewed from a second viewpoint in the object space, the first viewpoint and the second viewpoint implementing stereovision; and performing a drawing process to generate the first-viewpoint image and the second-viewpoint image, the drawing process changing a display state of an object as a distance from a right/left side of a screen decreases, the object being perspectively projected onto the screen.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Configuration

FIG. 1 shows an example of a block diagram of an image generation system (game system) according to one embodiment of the invention. Note that the image generation system according to one embodiment of the invention is not limited to the configuration shown in FIG. 1. Various modifications may be made, such as omitting some of the elements (sections) or adding other elements (sections).

An operation section 160 allows the player to input operation data. The function of the operation section 160 may be implemented by a direction key, an operation button, an analog stick, a lever, a sensor (e.g., angular speed sensor or acceleration sensor), a microphone, a touch panel display, or the like.

An imaging section 162 captures an object. The imaging section 162 may be implemented by an imaging element (e.g., CCD or CMOS sensor) and an optical system (e.g., lens). Imaging information (captured image data) acquired by the imaging section 162 is stored in an imaging information storage section 174.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (DVD or CD), a hard disk drive (HDD), a memory (e.g., ROM), or the like. The processing section 100 performs various processes according to one embodiment of the invention based on a program (data) stored in the information storage medium 180. Specifically, a program that causes a computer (i.e., a device including an operation section, a processing section, a storage section, and an output section) to function as each section according to one embodiment of the invention (i.e., a program that causes a computer to execute the process of each section) is stored in the information storage medium 180.

A display section 190 outputs an image generated according to one embodiment of the invention. The function of the display section 190 may be implemented by an LCD, an organic EL display, a CRT, a projector display, a head-mounted display (HMD), or the like. Such a display may be integrated with a touch panel or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to one embodiment of the invention may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes a game calculation section 102, an object space setting section 104, a moving object calculation section 106, a virtual camera control section 108, an information acquisition section 110, an area setting section 112, a viewpoint selection section 114, an image generation section 120, and a sound generation section 130.

The game calculation section 102 performs a game calculation process. The game calculation process includes starting the game when game start conditions have been satisfied, proceeding with the game, calculating the game results, and finishing the game when game finish conditions have been satisfied, for example.

The object space setting section 104 sets an object space in which a plurality of objects are disposed. For example, the object space setting section 104 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. Specifically, the object space setting section 104 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 172 included in the storage section 170 stores an object number and object data (e.g., the position, rotation angle, moving speed, and moving direction of the object (part object)) that is linked to the object number. The object space setting section 104 updates the object data every frame, for example.

The moving object calculation section 106 performs calculations for moving a moving object (e.g., character). The moving object calculation section 106 also performs calculations for causing the moving object to make a motion. Specifically, the moving object calculation section 106 causes the moving object (object or model object) to move or make a motion (animation) in the object space based on operation data input by the player using the operation section 160, a program (movement/motion algorithm), data (motion data), and the like. More specifically, the moving object calculation section 106 performs a simulation process that sequentially calculates movement information (position, rotational angle, speed, or acceleration) and motion information (position or rotational angle of a part object) about the moving object every frame (e.g., 1/60th of a second). The term "frame" used herein refers to a time unit used when performing the moving object movement/motion process (simulation process) or the image generation process.

The virtual camera control section 108 (viewpoint control section in a broad sense) performs a viewpoint control process. Specifically, the virtual camera control section 108 controls a virtual camera (viewpoint in a broad sense) for generating an image viewed from a given (arbitrary) viewpoint in the object space. For example, the virtual camera control section 108 controls the position (X, Y, Z) or the rotation angle (rotation angles around X, Y, and Z axes) of the virtual camera (i.e., controls the viewpoint position, the line-of-sight direction, or the angle of view of the virtual camera).

For example, when photographing a character from behind using the virtual camera, the virtual camera control section 108 controls the position (viewpoint position) and the direction (line-of-sight direction) of the virtual camera so that the virtual camera follows a change in position or direction of the character. In this case, the virtual camera control section 108 may control the virtual camera based on information (e.g., position, direction, or speed) about the character obtained by the moving object calculation section 106. Alternatively, the virtual camera control section 108 may rotate the virtual camera by a predetermined rotation angle, or may move the virtual camera along a predetermined path. In this case, the virtual camera control section 108 controls the virtual camera based on virtual camera data that specifies the position (moving path) or the direction of the virtual camera.

The information acquisition section 110 acquires information based on the imaging information from the imaging section 162, and the like. For example, the information acquisition section 110 acquires color information about an area around the screen of the display section 190 that displays an image (color information about an area around the screen of the display section 190 when viewed from the player). Alternatively, the information acquisition section 110 acquires position information (position information relative to the screen of the display section 190) about the left eye and the right eye of the player (observer). For example, the information acquisition section 110 acquires positional relationship information about the screen of the display section 190 and the player (position information about the player relative to the screen).

The area setting section 112 performs a process that sets an inner drawing area within a common area (overlapping area) of a first-viewpoint view volume (left-eye view volume in a narrow sense) and a second-viewpoint view volume (right-eye view volume in a narrow sense), and the like.

The viewpoint selection section 114 performs a viewpoint selection process when implementing multi-view stereovision or integral imaging stereovision.

The image generation section 120 performs a drawing process based on the results of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the results of the geometric process. The image generation section 120 draws the object (one or more primitive surfaces) subjected to perspective transformation in a drawing buffer 178 (i.e., a buffer (e.g., frame buffer or work buffer) that can store image information corresponding to each pixel) based on the drawing data (primitive surface data). The image generation section 120 thus generates an image viewed from the virtual camera (given viewpoint) in the object space.

The image generation section 120 may include a vertex processing section 122 and a pixel processing section 124, for example.

The vertex processing section 122 (vertex shader and geometry shader) performs a vertex process. Specifically, the vertex processing section 122 performs the vertex process (shading using a vertex shader) based on vertex data (e.g., vertex position coordinates, texture coordinates, color data, normal vector, or α-value) about the object. The vertex processing section 122 may optionally perform a vertex generation process (tessellation, surface division, or polygon division) for dividing the polygon when performing the vertex process.

In the vertex process, the vertex processing section 122 performs a vertex moving process and a geometric process such as coordinate transformation (world coordinate transformation or camera coordinate transformation), clipping, or perspective transformation based on a vertex processing program (vertex shader program or first shader program), and changes (updates or adjusts) the vertex data about each vertex that forms the object based on the processing results. The vertex processing section 122 then performs a rasterization process (scan conversion) based on the vertex data changed by the vertex process so that the surface of the polygon (primitive) is linked to pixels.

The pixel processing section 124 (pixel shader) performs a pixel process. Specifically, the pixel processing section 124 performs a pixel process (shading using a pixel shader or a fragment process) that draws the pixels that form the image (fragments that form the display screen) subsequent to the rasterization process.

In the pixel process, the pixel processing section 124 determines the drawing color of each pixel that forms the image by performing various processes such as a texture reading process (texture mapping), a color data setting/change process, a translucent blending process, and an anti-aliasing process based on a pixel processing program (pixel shader program or second shader program), and outputs (draws) the drawing color of the object that has been subjected to perspective transformation to (in) the drawing buffer 178. Specifically, the pixel process includes a per-pixel process that sets or changes the image information (e.g., color, normal, luminance, and α-value) corresponding to each pixel. An image viewed from the virtual camera (given viewpoint) in the object space is thus generated.

The vertex process and the pixel process may be implemented by hardware that enables a programmable polygon (primitive) drawing process (i.e., a programmable shader (vertex shader and pixel shader)) based on a shader program written in shading language. The programmable shader enables a programmable per-vertex process and a programmable per-pixel process, and increases the degree of freedom of the drawing process, so that the representation capability can be significantly improved as compared with a fixed drawing process using hardware.

The sound generation section 130 performs a sound process based on the result of various processes performed by the processing section 100 to generate game sound (e.g., background music (BGM), effect sound, or voice), and outputs the generated game sound to the sound output section 192.

The image generation section 120 generates a first-viewpoint image viewed from a first viewpoint in the object space, and a second-viewpoint image viewed from a second viewpoint in the object space, the first viewpoint and the second viewpoint implementing (binocular, multi-view, or integral imaging) stereovision.

In this case, the image generation section 120 performs a drawing process to generate the first-viewpoint image and the second-viewpoint image, the drawing process changing a display state (e.g., transparency, degree of defocus, or color) of an object in a direction from an inner drawing area (i.e., an area included in a common area) toward an area outside the inner drawing area (i.e., toward a right/left clipping plane), the inner drawing area being positioned within a common area (overlapping area) of a first-viewpoint view volume (first-viewpoint view frustum) corresponding to the first viewpoint and a second-viewpoint view volume (second-viewpoint view frustum) corresponding to the second viewpoint. Specifically, the image generation section 120 performs the drawing process that gradually changes the display state of the object from the inner drawing area within the common area toward a clipping plane (left clipping plane or right clipping plane) of the common area to generate the first-viewpoint image and the second-viewpoint image. In other words, the image generation section 120 performs the drawing process that changes the display state of the object as the distance from the right/left side (left side or right side) of a screen (onto which the object is perspectively projected) decreases to generate the first-viewpoint image and the second-viewpoint image.

When implementing binocular stereovision, for example, the virtual camera control section 108 sets a left-eye virtual camera and a right-eye virtual camera, and the image generation section 120 generates a left-eye image (first-viewpoint image in a broad sense) viewed from the left-eye virtual camera (first viewpoint in a broad sense) in the object space, and generates a right-eye image (second-viewpoint image in a broad sense) viewed from the right-eye virtual camera (second viewpoint in a broad sense) in the object space. The image generation section 120 performs a drawing process to generate the left-eye image and the right-eye image, the drawing process changing a display state of an object in a direction from an inner drawing area toward an area outside the inner drawing area, the inner drawing area being positioned within a common area of a left-eye view volume (first-viewpoint view volume in a broad sense) corresponding to the left-eye virtual camera and a right-eye view volume (second-viewpoint view volume in a broad sense) corresponding to the right-eye virtual camera.

The display state of the object may be changed by various methods. For example, the image generation section 120 performs the drawing process that causes the object to gradually become completely or almost transparent in a direction from an inner drawing area positioned within a common area of a first-viewpoint view volume (left-eye view volume) and a second-viewpoint view volume (right-eye view volume) toward an area outside the inner drawing area to generate a first-viewpoint image (left-eye image) and a second-viewpoint image (right-eye image). Alternatively, the image generation section 120 performs the drawing process that causes the object to be gradually defocused, or causes the color of the object to gradually approach a target color, in a direction from the inner drawing area toward an area outside the inner drawing area to generate a first-viewpoint image (left-eye image) and a second-viewpoint image (right-eye image). Note that the process that changes the display state of the object is not limited thereto. For example, the brightness (luminance) of the object may be gradually decreased (changed).

The target color for the color of the object may be set by various methods. For example, the information acquisition section 110 acquires color information about an area around the screen of the display section 190 that displays an image when viewed from the player. For example, the information acquisition section 110 acquires color information about an area (frame) of the display section 190 that surrounds the screen, or acquires color information about the background of the display section 190. The image generation section 120 sets the target color based on the acquired color information, and performs the drawing process that causes the color of the object to gradually approach the target color in a direction from the inner drawing area toward an area outside the inner drawing area to generate the first-viewpoint image and the second-viewpoint image.

When generating an image using the vertex shader and the pixel shader, the image generation section 120 obtains a first-viewpoint vertex screen position (left-eye vertex screen position) (i.e., the position of the vertex of the object on the screen within the first-viewpoint view volume (left-eye view volume)). Specifically, the image generation section 120 calculates a position obtained by perspectively projecting the vertex of the object onto the screen within the first-viewpoint view volume as the first-viewpoint vertex screen position. The image generation section 120 also obtains a second-viewpoint vertex screen position (right-eye vertex screen position) (i.e., the position of the vertex of the object on the screen within the second-viewpoint view volume (right-eye view volume)). Specifically, the image generation section 120 calculates a position obtained by perspectively projecting the vertex of the object onto the screen within the second-viewpoint view volume as the second-viewpoint vertex screen position.

The image generation section 120 performs the drawing process that gradually changes the display state (e.g., transparency, degree of defocus, or color) of the object based on the first-viewpoint vertex screen position (left-eye vertex screen position) and the second-viewpoint vertex screen position (right eye side vertex screen position) to generate the first-viewpoint image and the second-viewpoint image. Specifically, the image generation section 120 obtains a first α-value that is set corresponding to the distance between the first-viewpoint vertex screen position and the right/left side (left side or right side) of the screen, and a second α-value that is set corresponding to the distance between the second-viewpoint vertex screen position and the right/left side of the screen. The image generation section 120 sets the α-value of the vertex of the object based on the first α-value and the second α-value, and generates the first-viewpoint image and the second-viewpoint image. For example, the image generation section 120 sets the smaller of the first α-value and the second α-value to be the α-value of the vertex of the object, and performs the drawing process to generate the first-viewpoint image and the second-viewpoint image. This makes it possible to generate a first-viewpoint image and a second-viewpoint image so that the object gradually becomes completely or almost transparent from the inner drawing area toward the clipping plane of the common area of the first-viewpoint view volume and the second-viewpoint view volume.

The area setting section 112 may set the inner drawing area within the common area of the first-viewpoint (left-eye) view volume and the second-viewpoint (right-eye) view volume. In this case, the area setting section 112 changes the shape of the inner drawing area according to a change in the shape of the common area. Specifically, the position and the direction of the first-viewpoint view volume and the position and the direction of the second-viewpoint view volume change when the position and the direction of the first viewpoint (left-eye virtual camera) and the position and the direction of the second viewpoint (right-eye virtual camera) have changed, and the shape of the common area of the first-viewpoint view volume and the second-viewpoint view volume also change. In this case, the area setting section 112 changes the shape of the inner drawing area within the common area to follow the change in the shape of the common area. For example, the area setting section 112 changes the shape of the inner drawing area formed by a free-form surface (e.g., NURBS) using the vertex of the common area as a control point. Specifically, the area setting section 112 changes the shape of the inner drawing area formed by a free-form surface to follow the change in the position of the control point (i.e., the vertex of the common area).

The virtual camera control section 108 (viewpoint control section) controls a reference viewpoint (reference virtual camera or central camera) that is used as a reference for setting the first viewpoint (left-eye virtual camera) and the second viewpoint (right-eye virtual camera), for example. The virtual camera control section 108 calculates position information (viewpoint position) and direction information (line-of-sight direction) about the first viewpoint (left-eye virtual camera) and the second viewpoint (right-eye virtual camera) based on position information and direction information about the reference viewpoint (reference virtual camera) and information about an inter-viewpoint distance (inter-camera distance). Note that the virtual camera control section 108 may directly control the first viewpoint (left-eye virtual camera) and the second viewpoint (right-eye virtual camera).

The stereovision may be implemented by a stereoscopic glass method, a naked-eye method using a parallax barrier, a lenticular lens, or another optical element that can control the beam direction, or the like. Examples of the stereoscopic glass method include a polarized glass method, a page-flip method, a color separation method, and the like. When using the polarized glass method, a left-eye image and a right-eye image are alternately displayed in an odd-numbered line and an even-numbered line of the display section 190, and are observed through polarized glasses (e.g., glasses provided with a horizontal polarizing filter (left) and a vertical polarizing filter (right)) to implement stereovision. Alternatively, a left-eye image and a right-eye image may be projected using a projector provided with a special polarizing filter, and observed through polarized glasses to implement stereovision. When using the page-flip method, a left-eye image and a right-eye image are alternately displayed on the display section 190 in a given cycle (e.g., every 1/120th of a second or 1/60th of a second). A left-eye liquid crystal shutter and a right-eye liquid crystal shutter of glasses are alternately opened and closed in the above cycle to implement stereovision. When using the color separation method, an anaglyph image is generated, and observed through red-cyan glasses or the like to implement stereovision, for example.

The image generation section 120 or the display section 190 (e.g., television) may have the function of generating a stereoscopic image using the left-eye image and the right-eye image. For example, the image generation section 120 outputs side-by-side image signals. The display section 190 then displays a field-sequential image in which the left-eye image and the right-eye image are alternately assigned to an odd-numbered line and an even-numbered line based on the side-by-side image signals. The display section 190 may display a frame-sequential image in which the left-eye image and the right-eye image are alternately switched in a given cycle. Alternatively, the image generation section 120 may generate a field-sequential image or a frame-sequential image, and output the generated image to the display section 190.

The information acquisition section 110 acquires position information about the left eye and the right eye of the player (observer). For example, the information acquisition section 110 acquires the position information about the left eye and the right eye relative to the screen of the display section 190. The virtual camera control section 108 (image generation section) sets the first-viewpoint view volume (left-eye view volume or left-eye virtual camera) and the second-viewpoint view volume (right-eye view volume or right-eye virtual camera) based on the acquired position information. For example, the virtual camera control section 108 sets the position and the direction of the first-viewpoint view volume and the position and the direction of the second-viewpoint view volume. Therefore, the position and the direction of the first-viewpoint view volume and the position and the direction of the second-viewpoint view volume change corresponding to a change in position of the left eye and the right eye of the player, so that a binocular tracking image (described later) can be generated.

In this case, a left-eye marker corresponding to the left eye of the player and a right-eye marker corresponding to the right eye of the player may be provided to a recognition member worn by the player, for example. The information acquisition section 110 acquires the position information about the left eye and the right eye of the player based on the imaging information from the imaging section 162 that images the recognition member worn by the player. Specifically, an image of the recognition member worn by the player is captured using the imaging section 162, and the left-eye marker and the right-eye marker of the recognition member are recognized by an image recognition process based on the imaging information. The position of the left-eye marker and the position of the right-eye marker are detected based on the image recognition results to obtain the position information about the left eye and the right eye of the player. This makes it possible to detect the position information about the left eye and the right eye of the observer by a simple process that effectively utilizes the imaging section 162. The marker may be attached to glasses of an eyeglass-type stereoscopic display device. The marker need not be used when the position of the left eye and the position of the right eye can be detected by face recognition technology or the like without using the marker.

The information acquisition section 110 may acquire distance information about the distance between the left eye and the right eye of the player. The virtual camera control section 108 sets the inter-viewpoint distance (inter-camera distance) between the first viewpoint (left-eye virtual camera) and the second viewpoint (right-eye virtual camera) based on the acquired distance information, and sets the first-viewpoint view volume (left-eye view volume or left-eye virtual camera) and the second-viewpoint view volume (right-eye view volume or right-eye virtual camera). Specifically, glasses having an adjustment mechanism for adjusting the distance between the left-eye part and the right-eye part are provided as the recognition member. The information acquisition section 110 acquires the distance information about the distance between the left eye and the right eye of the player based on the imaging information about the left-eye marker provided to the left-eye part of the glasses and the right-eye marker provided to the right-eye part of the glasses. According to this configuration, the inter-viewpoint distance (inter-camera distance) between the first viewpoint (left-eye virtual camera) and the second viewpoint (right-eye virtual camera) changes when the player has changed the distance between the left-eye part and the right-eye part using the adjustment mechanism of the glasses, so that a stereoscopic image can be generated at a more appropriate inter-viewpoint distance. Glasses that differ in color or shape corresponding to the eye-to-eye distance may be provided, and the eye-to-eye distance corresponding to respective glasses may be set by capturing and recognizing the difference in color or shape using a camera or the like. For example, child glasses and adult glasses that differ in color or shape may be provided, and a child parallax setting process may be performed by recognizing the difference in color or shape. Note that this method may be implemented by changing the color or shape of the entire glasses, or may be implemented by changing the color or shape of only the recognition member.

Note that the first viewpoint and the second viewpoint used to generate the first-viewpoint image and the second-viewpoint image respectively refer to the viewpoint of a left-eye virtual camera and the viewpoint of a right-eye virtual camera that implement binocular stereovision. The first viewpoint and the second viewpoint may be viewpoints used to implement multi-view stereovision or integral imaging stereovision.

The information acquisition section 110 acquires positional relationship information about the screen of the display section 190 and the player (observer). The positional relationship information may be position information about the left eye and the right eye of the player, for example. Note that it suffices that the positional relationship information be information that indicates the relative positional relationship between the screen of the display section 190 and the player (i.e., the left eye and the right eye of the player). For example, motion information about the screen of the display section 190 relative to the player may be acquired as the positional relationship information. For example, when the player has moved a portable game device, the positional relationship information may be acquired by detecting the motion of the screen or the like using a built-in motion sensor (e.g., gyrosensor or acceleration sensor).

The viewpoint selection section 114 selects the first viewpoint and the second viewpoint that implement multi-view stereovision or integral imaging stereovision based on the acquired positional relationship information. The image generation section 120 generates the first-viewpoint image viewed from the first viewpoint and the second-viewpoint image viewed from the second viewpoint as a stereoscopic image, the first viewpoint and the second viewpoint implementing stereovision. For example, the image generation section 120 generates an image that should be observed by the player with the left eye as the first-viewpoint image, and generates an image that should be observed by the player with the right eye as the second-viewpoint image. When implementing integral imaging stereovision, the image drawing range may be set to include the first viewpoint and the second viewpoint that have been selected, and an image within the image drawing range may be generated.

The image generation section 120 performs a drawing process to generate the first-viewpoint image and the second-viewpoint image, the drawing process changing a display state of an object in a direction from an inner drawing area toward an area outside the inner drawing area, the inner drawing area being positioned within a common area (non-frame violation area) of a first-viewpoint view volume selected based on the positional relationship information and a second-viewpoint view volume selected based on the positional relationship information. For example, when the first viewpoint for generating the first-viewpoint image and the second viewpoint for generating the second-viewpoint image have been selected when implementing multi-view stereovision or integral imaging stereovision, the image generation section 120 generates a stereoscopic image so that the display state of the object changes in a direction from the inner drawing area within the common area of the first-viewpoint view volume and the second-viewpoint view volume toward an area outside the inner drawing area. This makes it possible to implement stereoscopic display appropriate for multi-view stereovision or integral imaging stereovision when the first viewpoint and the second viewpoint have been selected when implementing multi-view stereovision or integral imaging stereovision.

2. Method

A method according to one embodiment of the invention is described in detail below.

2.1 Change in Display State in Direction from Inner Drawing Area Toward Area Outside Inner Drawing Area A view volume is set as described below when implementing stereovision. The following description is given mainly taking an example of implementing binocular stereovision. When implementing binocular stereovision, the first viewpoint is the viewpoint of a left-eye virtual camera, and the second viewpoint is the viewpoint of a right-eye virtual camera, for example. Note that the method according to one embodiment of the invention may also be applied when implementing various types of stereovision (e.g., multi-view stereovision or integral imaging stereovision) (described later) other than binocular stereovision.

Figure 2:
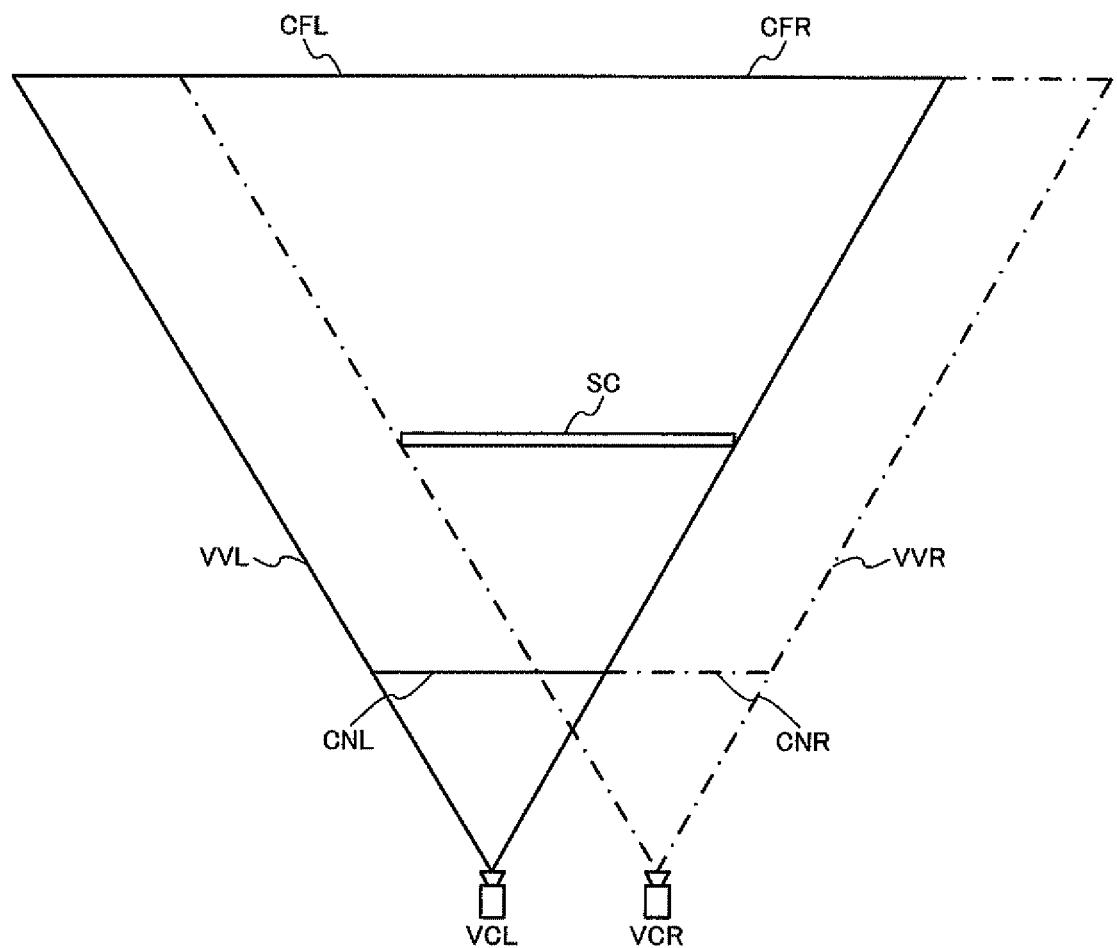
FIG. 2 is a view illustrative of a method that sets a left-eye view volume and a right-eye view volume.

As shown in FIG. 2, a left-eye virtual camera VCL (first-viewpoint camera in a broad sense) and a right-eye virtual camera VCR (second-viewpoint camera in a broad sense) that are set at a given inter-camera distance are used to generate a stereoscopic image, for example.

A left-eye view volume VVL (left-eye view frustum, first-viewpoint view volume, or first-viewpoint view frustum) is set corresponding to the left-eye virtual camera VCL, and a right-eye view volume VVR (right-eye view frustum, second-viewpoint view volume, or second-viewpoint view frustum) is set corresponding to the right-eye virtual camera VCR. Specifically, the position and the direction of the left-eye view volume VVL are set based on the position and the direction of the left-eye virtual camera VCL, and the position and the direction of the right-eye view volume VVR are set based on the position and the direction of the right-eye virtual camera VCR.

A left-eye image (i.e., an image viewed from the left-eye virtual camera VCL) is generated by perspectively projecting (drawing) an object present within the left-eye view volume VVL onto a screen SC. A right-eye image (i.e., an image viewed from the right-eye virtual camera VCR) is generated by perspectively projecting (drawing) an object present within the right-eye view volume VVR onto the screen SC. Since an object that is positioned so that the object is not perspectively projected onto the screen SC is excluded from the drawing target, it is useless to perform the perspective projection transformation process on such an object.

Figure 3:
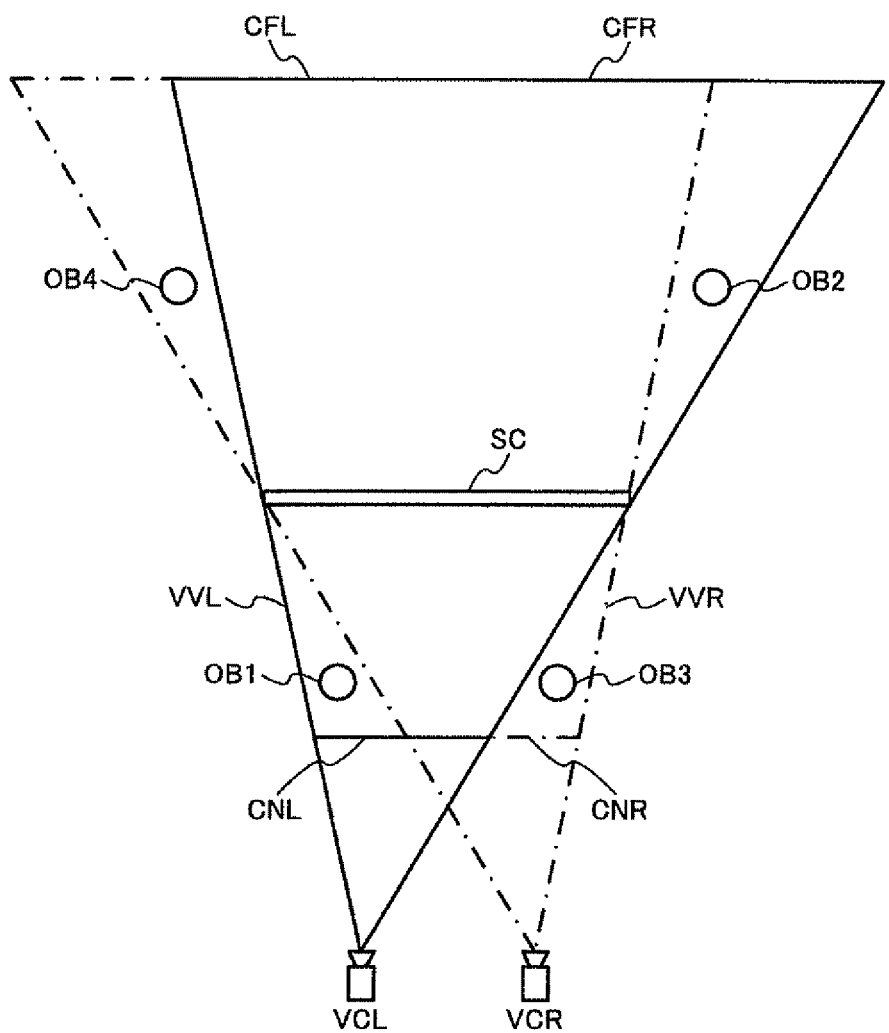
FIG. 3 is a view illustrative of a method that sets a left-eye view volume and a right-eye view volume.

Therefore, the left-eye view volume VVL and the right-eye view volume VVR are actually set as shown in FIG. 3. Specifically, an object that is not perspectively projected onto the screen SC is excluded from the drawing target by a clipping process using the left-eye view volume VVL and the right-eye view volume VVR. This makes it possible to prevent a situation in which an unnecessary process is performed, so that the processing load can be reduced.

In FIG. 3, reference symbols CNL and CFL respectively indicate the near clipping plane and the far clipping plane of the left-eye view volume VVL, and reference symbols CNR and CFR respectively indicate the near clipping plane and the far clipping plane of the right-eye view volume VVR.

When the left-eye view volume VVL and the right-eye view volume VVR are set as shown in FIG. 3, objects OB1 and OB2 are present within the left-eye view volume VVL, but are not present within the right-eye view volume VVR, for example. Therefore, the objects OB1 and OB2 are drawn on the screen SC when generating the left-eye image, but are not drawn on the screen SC when generating the right-eye image. Accordingly, the player can observe an image of the objects OB1 and OB2 with the left eye that sees the left-eye image, but cannot observe an image of the objects OB1 and OB2 with the right eye that sees the right-eye image.

Likewise, objects OB3 and OB4 are present within the right-eye view volume VVR, but are not present within the left-eye view volume VVL. Therefore, since the objects OB3 and OB4 are drawn when generating the right-eye image, but are not drawn when generating the left-eye image, the player can observe an image of the objects OB3 and OB4 with the right eye, but cannot observe an image of the objects OB3 and OB4 with the left eye. An area that can be observed with only the left eye or the right eye is referred to as "frame violation area (window violation area)".

If the observable object differs between the left eye and the right eye of the player, the player may be given a wrong impression when observing a stereoscopic image. In particular, when an object is present to cross the clipping plane of the view volume, the object is clipped by the clipping plane when observed with one eye, but is not clipped by the clipping plane when observed with the other eye, so that an inconsistent (unnatural) stereoscopic image (stereovision) may be generated.

Figure 4:
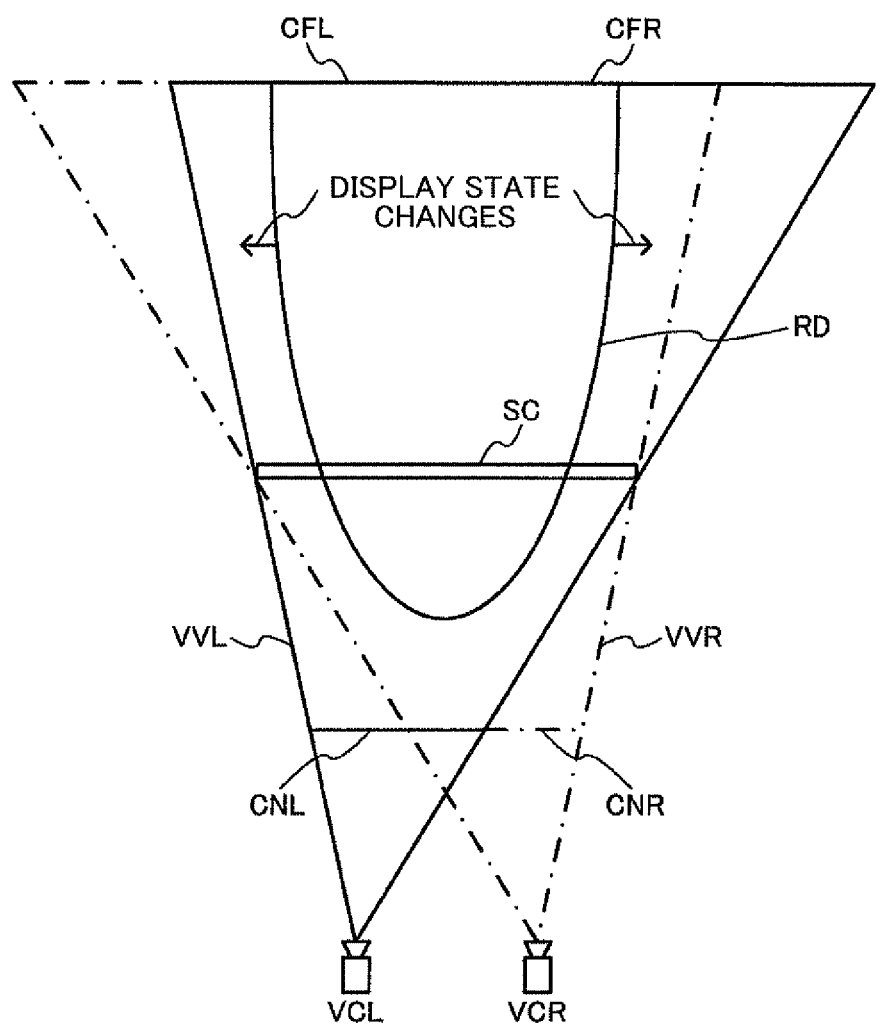
FIG. 4 is a view illustrative of a method according to one embodiment of the invention.

One embodiment of the invention employs a method shown in FIG. 4 in order to solve the above problem. An inner drawing area RD shown in FIG. 4 is an area positioned within (included in) a common area of the left-eye view volume VVL and the right-eye view volume VVR.

In FIG. 4, a drawing process that changes the display state of an object in a direction from the inner drawing area RD toward an area outside the inner drawing area RD is performed to generate a left-eye image and a right-eye image. For example, a drawing process that causes an object to gradually become completely or almost transparent, or causes an object to be gradually defocused, or causes the color of an object to gradually approach a target color is performed to generate a left-eye image and a right-eye image. This makes it possible to prevent a situation in which an inconsistent (unnatural) stereoscopic image is generated.

Figure 5:
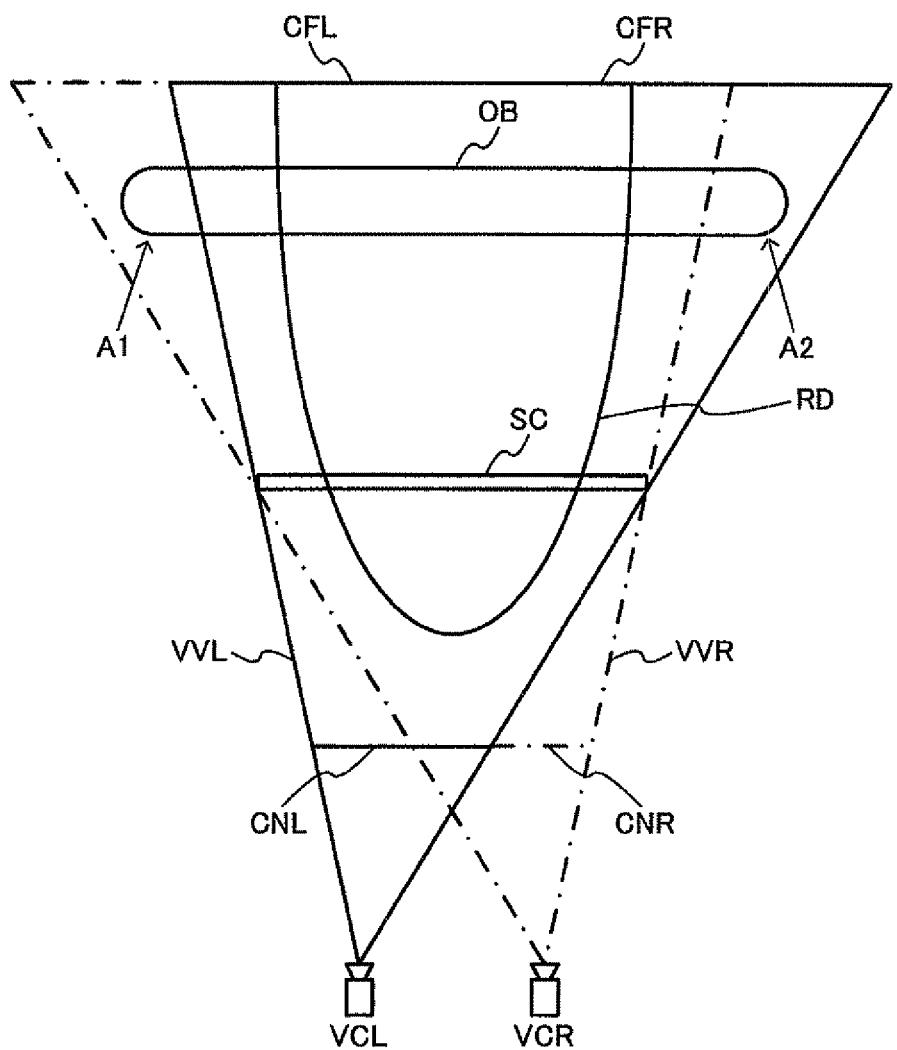
FIG. 5 is a view illustrative of a method according to one embodiment of the invention.

In FIG. 5, an object OB is present to cross the clipping plane of the view volume, for example.

In this case, an area of the object OB indicated by A1 is positioned within the field of view of the right-eye virtual camera VCR. On the other hand, the object OB is clipped by the left clipping plane when observed from the left-eye virtual camera VCL (i.e., the area of the object OB indicated by A1 is outside the field of view of the left-eye virtual camera VCL). An area of the object OB indicated by A2 is positioned within the field of view of the left-eye virtual camera VCL. On the other hand, the object OB is clipped by the right clipping plane when observed from the right-eye virtual camera VCR (i.e., the area of the object OB indicated by A2 is outside the field of view of the right-eye virtual camera VCR). Therefore, since the object OB is observed in a different way from the left-eye virtual camera VCL and the right-eye virtual camera VCR at a position around the clipping plane, the player may be given a wrong impression.

The method according to one embodiment of the invention changes the display state of the object (e.g., causes the object to gradually become completely or almost transparent) in a direction from the inner drawing area RD toward an area outside the inner drawing area RD. This makes it possible to reduce the difference in the image of the object OB in an area around the right/left side of the screen SC, and provide the player with a more natural stereoscopic image.

Figure 6:
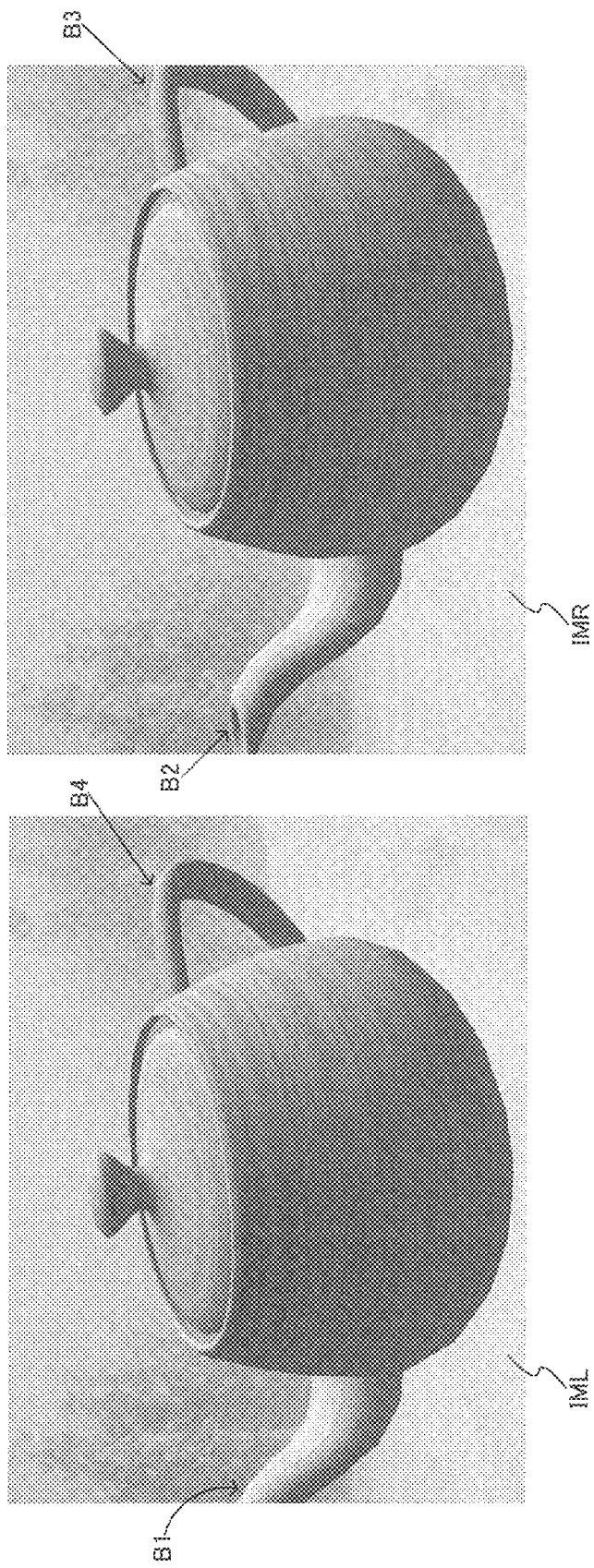
FIG. 6 shows an example of a left-eye image and a right-eye image generated when a method according to one embodiment of the invention is not used.

FIG. 6 shows an example of a left-eye image IML and a right-eye image IMR that are generated without using the method according to one embodiment of the invention. The left-eye image IML is generated so that the end of the spout of the teapot is cut off (see B1 in FIG. 6), while the right-eye image IMR is generated so that almost the entire spout is within the field of view (see B2). The right-eye image IMR is generated so that the rear end of the handle of the teapot is cut off (see B3), while the left-eye image IML is generated so that the entire handle is within the field of view (see B4).

Figure 7:
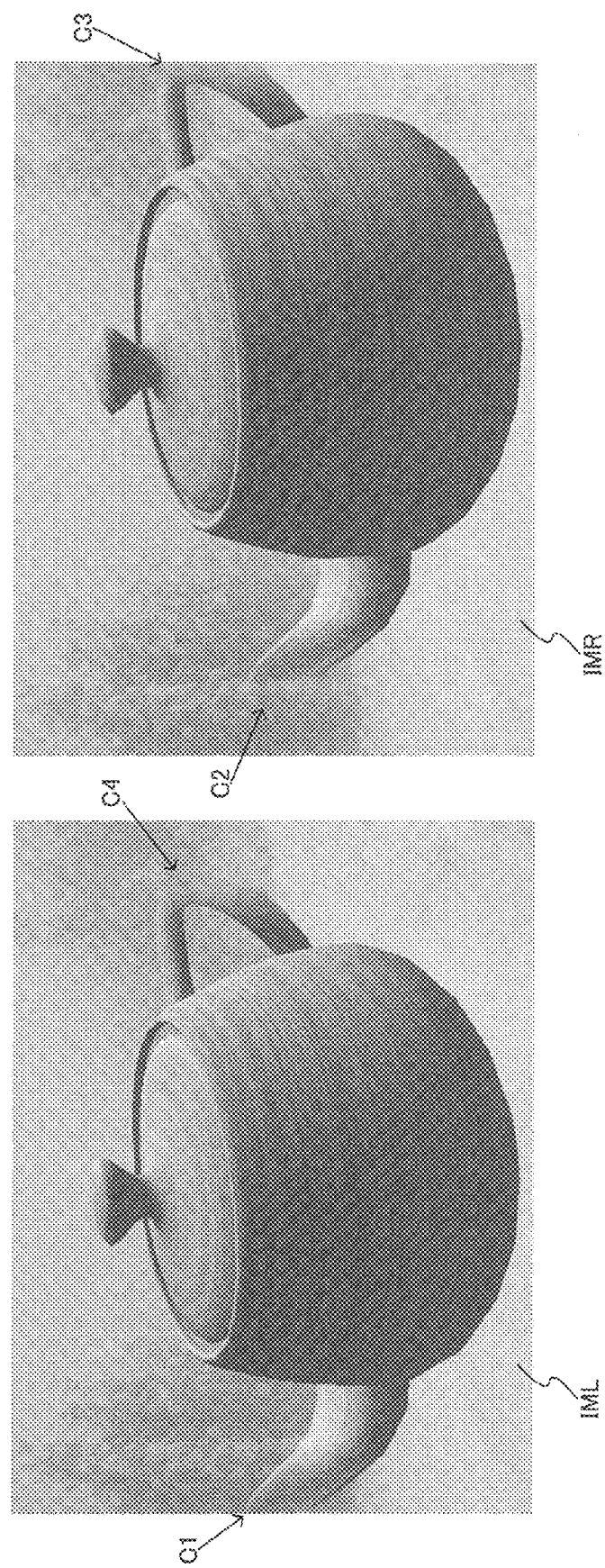
FIG. 7 shows an example of a left-eye image and a right-eye image generated when using a method according to one embodiment of the invention.

FIG. 7 shows an example of a left-eye image IML and a right-eye image IMR that are generated using the method according to one embodiment of the invention. As indicated by C1, C2, C3, and C4 in FIG. 7, the display state of the object changes as the distance from the right/left side of the screen decreases. Specifically, the end of the spout gradually becomes completely or almost transparent (translucent) as the distance from the left side of the screen decreases (see C1 and C2). The rear end of the handle also gradually becomes completely or almost transparent as the distance from the right side of the screen decreases (see C3 and C4). Therefore, the difference between the left-eye image IML and the right-eye image IMR in an area around the right/left side of the screen is reduced as compared with FIG. 6. This makes it possible to reduce inconsistency in the image that may occur when the object is clipped by the clipping plane, for example, so that a more natural stereoscopic image can be provided.

Although FIG. 7 illustrates an example in which the object is caused to gradually become completely or almost transparent as the distance from the right/left side of the screen (i.e., the right clipping plane or the left clipping plane) decreases, the method according to one embodiment of the invention is not limited thereto.

For example, a drawing process that causes the object to be gradually defocused (motion-blurred) as the distance from the right/left side of the screen (i.e., the right clipping plane or the left clipping plane) decreases may be performed to generate a left-eye image and a right-eye image. In this case, since the object is blurred as the distance from the right/left side of the screen decreases, the same effect as that illustrated in FIG. 7 can be achieved. The defocusing process may be implemented by utilizing a blur filter or the like. Specifically, the defocusing process may be implemented by utilizing a linear texture filtering method (i.e., a blur process using bilinear filtering), box filter sampling (i.e., a multi-texture blur process that uses a plurality of textures at the same time), or the like.

For example, when an object can be observed with each eye, but is partially positioned outside the screen (i.e., a large area of the object is observed with one eye, but only a small area of the object is observed with the other eye), a situation in which the player is given a wrong impression due to the difference in visible range can be suppressed by performing the defocusing process.

A drawing process that causes the color of the object to gradually approach a target color as the distance from the right/left side of the screen decreases may be performed to generate a left-eye image and a right-eye image. This also achieves the same effect as that illustrated in FIG. 7.

Note that it is preferable to use the translucent process that causes the object to gradually become completely or almost transparent (see FIG. 7) or the defocusing process that causes the object to be gradually defocused (blurred) since a more natural image can be generated even when a number of objects are disposed. For example, when a first object OB1 (e.g., background object) and a second object OB2 (i.e., processing target) are displayed in a superimposed state around the edge of the screen, an inconsistent (unnatural) image is not generated even if the object OB2 gradually becomes completely or almost transparent (translucent process) or is gradually defocused (defocusing process) as the distance from the edge of the screen decreases. When using the method that causes the color of the object to gradually approach the target color, however, an image may be generated so that an area of the object OB1 corresponding to the object OB2 is set to the target color that differs from the color of the object OB1. Therefore, it is preferable to use the translucent process or the defocusing process as compared with the method that causes the color of the object to gradually approach the target color.

When using the method that causes the color of the object to gradually approach the target color, an arbitrary color may be used as the target color. For example, the color of an area around the screen of the display section 190 that displays an image when viewed from the player may be used as the target color. This makes it possible to implement optical camouflage.

Specifically, the color of the background of the display section 190, the color of the edge area of the display section 190 that surrounds the screen, or the like may be used as the target color (see FIG. 8). This makes it possible to eliminate the presence of the screen of the display section 190, and implement image representation as if the object were present in a space.

When using the method shown in FIG. 8, the information acquisition section 110 acquires the color information about an area around the screen of the display section 190. For example, an image of the display section 190 and an area around the display section 190 is captured using the imaging section 162 included in a game controller 161 or the like. The color information about an area of the display section 190 that surrounds the screen or the background of the display section 190 is detected based on the resulting imaging information. The target color is set based on the detected color information. For example, when the color of the edge that surrounds the screen is a dark color, a dark color is set as the target color. When the color of the background is blue, blue or a color close to blue is set as the target color. This makes it possible to generate an image so that the game image displayed on the screen blends with the background, so that novel image representation can be implemented.

Note that the imaging section that acquires the target color may be disposed in various ways. For example, an image may be captured using the imaging section provided on the back side of a display section of a mobile phone or a portable game device to acquire the background color, and the target color may be set corresponding to the background color.

2.2 Specific Processing Example

A specific processing example according to one embodiment of the invention is described below. The following processing example utilizes a vertex shader and a pixel shader.

Figure 9A:
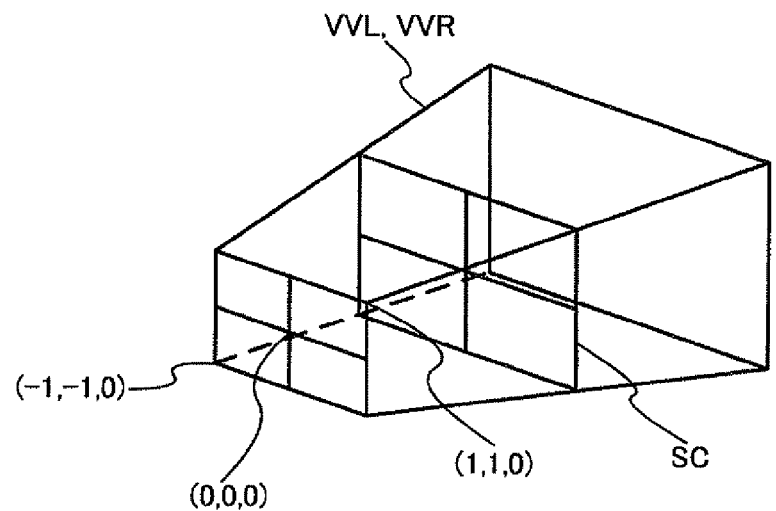
FIGS. 9A and 9B are views illustrative of a specific process according to one embodiment of the invention.

FIG. 9A shows the view volumes VVL and VVR and the screen SC. The vertex of the object (model) is perspectively projected onto the screen SC using the following expression (1).

$$\begin{pmatrix} x^P \\ y^P \\ z^P \\ w^P \end{pmatrix} = M \begin{pmatrix} x^m \\ y^m \\ z^m \\ w^m \end{pmatrix} \quad (1)$$

where, $(X^m, Y^m, Z^m)$ is the position of the vertex that defines the shape of the object, M is a projection matrix for perspectively projecting the object onto the screen, and $(X^P, Y^P, Z^P, W^P)$ is a vertex screen position that is the position of the vertex of the object on the screen.

The vertex screen position is normalized by the following expression (2).

$$\begin{pmatrix} X \\ Y \\ Z \end{pmatrix} = \begin{pmatrix} x^P/w^P \\ y^P/w^P \\ z^P/w^P \end{pmatrix} \quad (2)$$

where, (X, Y, Z) is the vertex screen position normalized using the depth. As shown in FIG. 9A, the range of the X-coordinate value of the vertex screen position is $-1.0 \leq X \leq 1.0$. The α-value (transparency) is calculated by the following expression (3) using the X-coordinate value.

$$\alpha = \begin{cases} \max\left(0, \dfrac{1-X}{1-t}\right) & (t < X) \\ \max\left(0, \dfrac{1+X}{1-t}\right) & (X < -t) \\ 1.0 & (-t \leq X \leq t) \end{cases} \quad (3)$$

where, t is a parameter that indicates a point at which the object starts to become completely or almost transparent (i.e., the ratio at which the object starts to become completely or almost transparent), and MAX(A, B) is a function that outputs the larger of A and B.

Figure 9B:
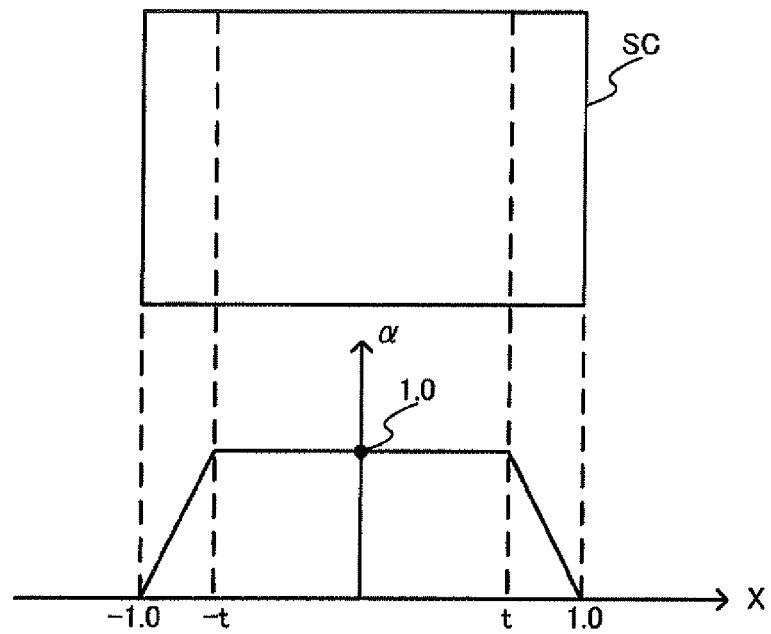

The α-value is set to the X-coordinate value of the vertex screen position by the expression (3) (see FIG. 9B). Specifically, α=1.0 (opaque) when $-t \leq X \leq t$. The α-value gradually decreases when the X-coordinate value has become smaller than −t, and eventually becomes 0 (transparent). The α-value gradually decreases when the X-coordinate value has become larger than t, and eventually becomes 0 (transparent). A drawing process that causes the object to gradually become completely or almost transparent as the distance from the right/left side of the screen SC decreases can be implemented by thus setting the α-value.

A specific processing example according to one embodiment of the invention is described below using flowcharts shown in FIGS. 10 and 11.

Figure 10:
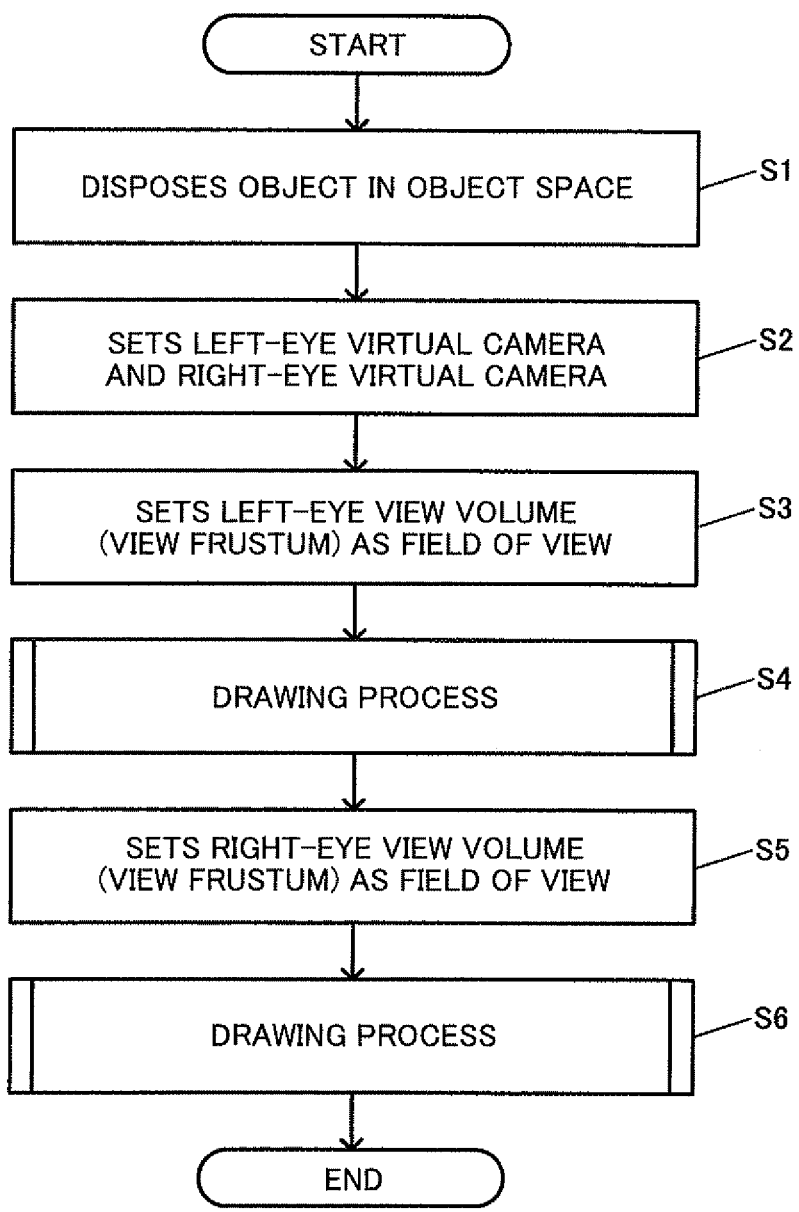
FIG. 10 is a flowchart illustrative of a specific process according to one embodiment of the invention.

As shown in FIG. 10, an object is disposed in the object space (step S1). For example, the game calculation process and the moving object movement calculation process are performed based on the operation information about the player to determine the position of the object in each frame, and the object is disposed in the object space.

Next, the left-eye virtual camera and the right-eye virtual camera are set (step S2). For example, the position and the direction of the left-eye virtual camera and the position and the direction of the right-eye virtual camera are set based on the position, the direction, and the like of a reference virtual camera calculated by controlling the virtual camera.

The left-eye view volume (view frustum) is set as the field of view, and the drawing process is performed (steps S3 and S4). A left-eye image (i.e., an image viewed from the left-eye virtual camera) is thus generated. The right-eye view volume (view frustum) is set as the field of view, and the drawing process is performed (steps S5 and S6). A right-eye image (i.e., an image viewed from the right-eye virtual camera) is thus generated.

Figure 11:
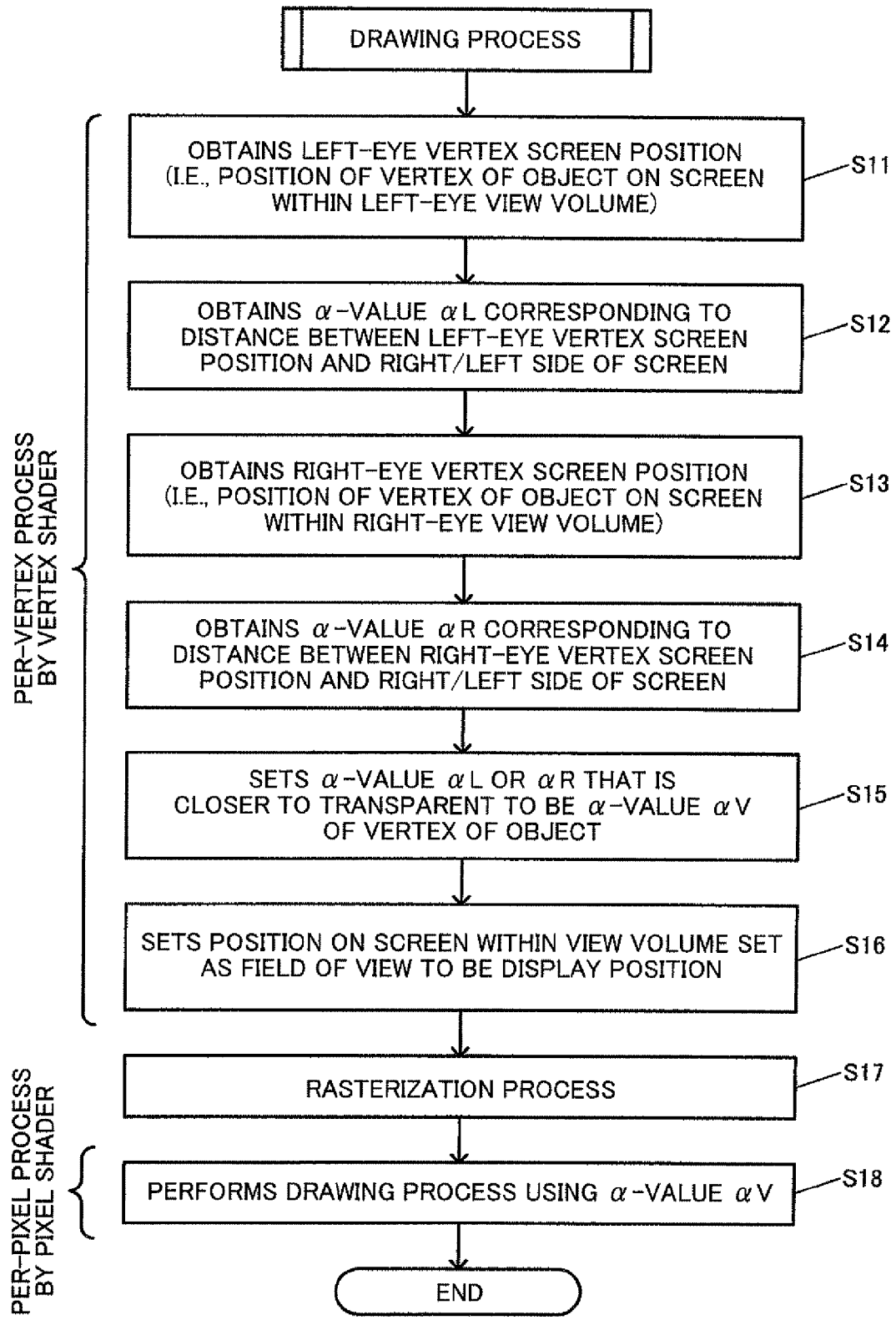
FIG. 11 is a flowchart illustrative of a specific process according to one embodiment of the invention.

FIG. 11 is a flowchart showing a specific example of the drawing process performed in the steps S4 and S5 in FIG. 10.

The left-eye vertex screen position (i.e., the position of the vertex of the object on the screen within the left-eye view volume) is obtained (step S11). Specifically, the left-eye vertex screen position corresponding to the vertex of the object is obtained by performing the perspective projection transformation process (see the expressions (1) and (2)) within the left-eye view volume. A first α-value αL corresponding to the distance between the left-eye vertex screen position and the right/left side of the screen is obtained (see the expression (3) and FIG. 9B) (step S12).

The right-eye vertex screen position (i.e., the position of the vertex of the object on the screen within the right-eye view volume) is obtained (step S13). Specifically, the right-eye vertex screen position corresponding to the vertex of the object is obtained by performing the perspective projection transformation process (see the expressions (1) and (2)) within the right-eye view volume. A second α-value αR corresponding to the distance between the right-eye vertex screen position and the right/left side of the screen is obtained (see the expression (3) and FIG. 9B) (step S14).

The α-value αL or αR that is closer to transparent (0.0) is set to be the α-value αV of the vertex of the object (step S15). The position on the screen within the view volume set as the field of view is set to be the display position (step S16). For example, when performing the drawing process in the step S4 in FIG. 10 when the left-eye volume is set as the field of view, the position on the screen within the left-eye volume is set to be the display position. When performing the drawing process in the step S6 in FIG. 10 when the right-eye volume is set as the field of view, the position on the screen within the right-eye volume is set to be the display position.

When the process in the steps S11 to S16 has been performed as a per-vertex process by the vertex shader, the rasterization process is performed (step S17). The drawing process is then performed using the α-value αV (step S18). The process in the step S18 is performed as a per-pixel process by the pixel shader.

The process in the steps S12 to S15 is further described below with reference to FIGS. 12A and 12B.

Figure 12A:
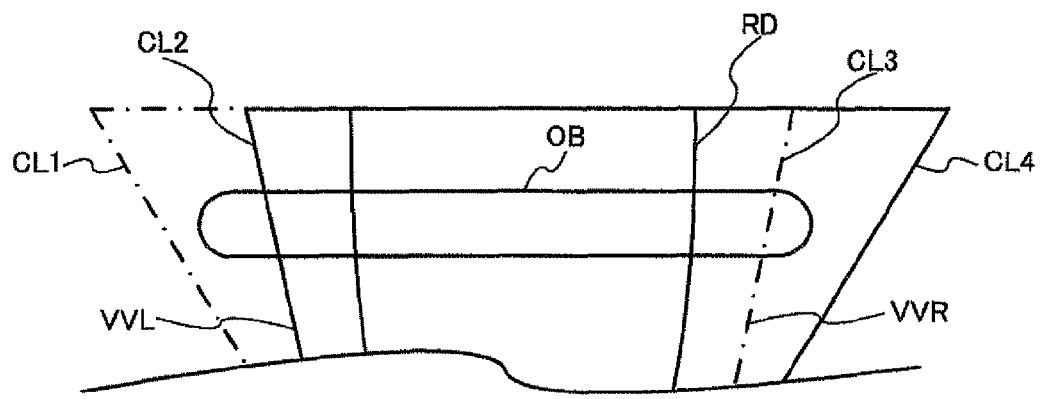
FIGS. 12A and 12B are views illustrative of an α-value setting method employed in a specific process according to one embodiment of the invention.

In FIG. 12A, reference symbols CL2 and CL4 respectively indicate the left clipping plane and the right clipping plane of the left-eye view volume VVL. Reference symbols CL1 and CL3 respectively indicate the left clipping plane and the right clipping plane of the right-eye view volume VVR.

Figure 12B:
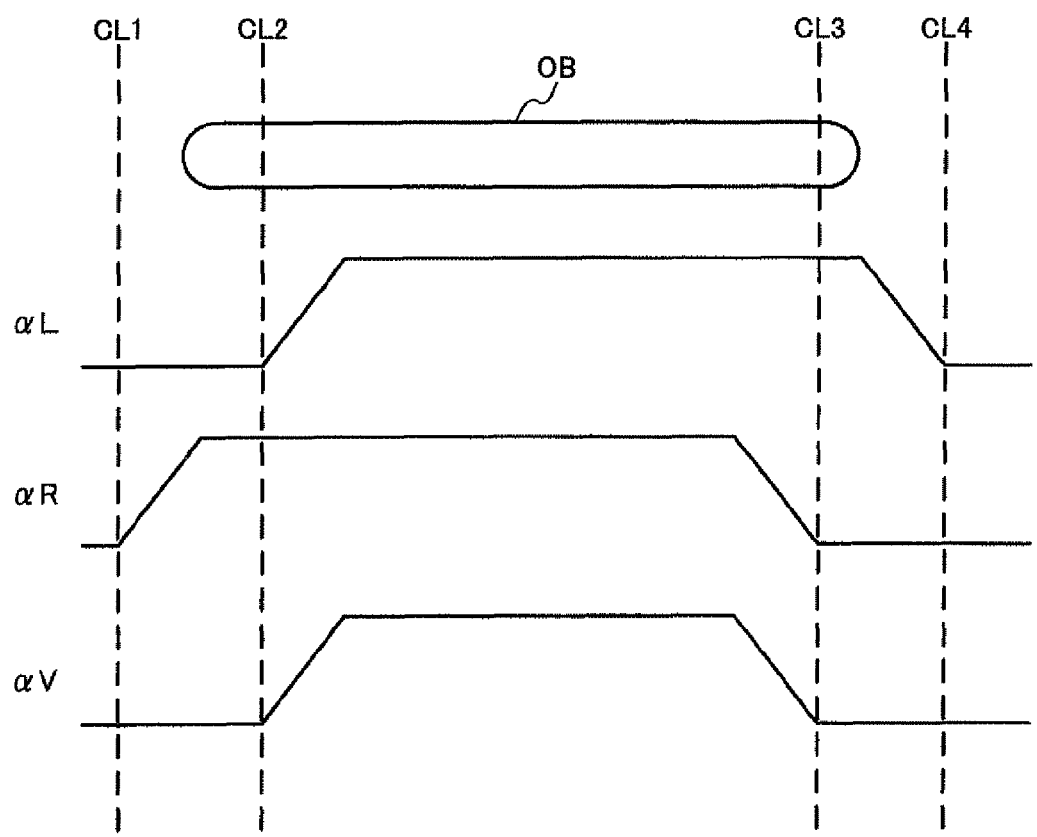

In this case, when the α-value is calculated as shown by the expression (3) and FIG. 9B, the α-values αL and αR are set to values shown in FIG. 12B in the steps S12 and S14 in FIG. 11.

For example, the α-value αL is set to 1.0 (opaque) within the inner drawing area RD, gradually decreases as the distance from the left clipping plane CL2 of the left-eye view volume VVL decreases, and is eventually set to 0.0 (transparent). The α-value αL is set to 0.0 in the area between the clipping planes CL2 and CL1. The α-value αL gradually decreases as the distance from the right clipping plane CL4 of the left-eye view volume VVL decreases, and is eventually set to 0.0 (transparent).

The α-value αR is set to 1.0 within the inner drawing area RD, gradually decreases as the distance from the left clipping plane CL1 of the right-eye view volume VVR decreases, and is eventually set to 0.0. The α-value αR gradually decreases as the distance from the right clipping plane CL3 of the right-eye view volume VVR decreases, and is eventually set to 0.0. The α-value αR is set to 0.0 in the area between the clipping planes CL3 and CL4.

In the step S15 in FIG. 11, the α-value αL or αR that is closer to transparent (0.0) is set to be the α-value αV of the vertex of the object. Therefore, the α-value αV of the vertex of the object is set as shown in FIG. 12B. Specifically, the α-value αV is set to 1.0 within the inner drawing area RD, gradually decreases as the distance from the left clipping plane CL2 of the left-eye view volume VVL decreases, and is eventually set to 0.0. The α-value αV gradually decreases as the distance from the right clipping plane CL3 of the right-eye view volume VVR decreases, and is eventually set to 0.0.

The left-eye image IML and the right-eye image IMR shown in FIG. 7 are generated by performing the drawing process using the α-value αV determined as described above.

In the left-eye image IML shown in FIG. 7, the end of the spout is clipped by the left clipping plane CL2 of the left-eye view volume VVL (see C1). Since the α-value αV gradually decreases as the distance from the clipping plane CL2 decreases (see FIG. 12B), the image of the spout gradually becomes completely or almost transparent as the distance from the left side of the screen decreases (see C1).

The α-value αV gradually decreases as the distance from the right clipping plane CL3 of the right-eye view volume VVR decreases (see FIG. 12B). Therefore, the image of the handle gradually becomes completely or almost transparent as the distance from the right side of the screen decreases (see C4).

In the right-eye image IMR shown in FIG. 7, the rear end of the handle of the teapot is clipped by the right clipping plane CL3 of the right-eye view volume VVR (see C3). Since the α-value αV gradually decreases as the distance from the clipping plane CL3 decreases (see FIG. 12B), the image of the handle gradually becomes completely or almost transparent as the distance from the right side of the screen decreases (see C3).

The α-value αV gradually decreases as the distance from the left clipping plane CL2 of the left-eye view volume VVL decreases (see FIG. 12B). Therefore, the image of the spout gradually becomes completely or almost transparent as the distance from the left side of the screen decreases (see C2).

The above method makes it possible to reduce the difference in the visual state of the object between the left-eye image IML and the right-eye image IMR (see FIG. 7), and provide a more natural stereoscopic image.

2.3 Inner Drawing Area Setting

One embodiment of the invention employs a method that detects the positions of the left eye and the right eye of the player, and generates an image corresponding to the positions of the left eye and the right eye (hereinafter may be appropriately referred to as "binocular tracking method") (described later). When using the binocular tracking method, the position and the direction of the left-eye virtual camera and the position and the direction of the right-eye virtual camera change corresponding to a change in position of the left eye and the right eye of the player, and the position and the direction of the left-eye view volume and the position and the direction of the right-eye view volume change accordingly. Therefore, the shape of the common area of the left-eye view volume and the right-eye view volume also changes.

Figure 13A:
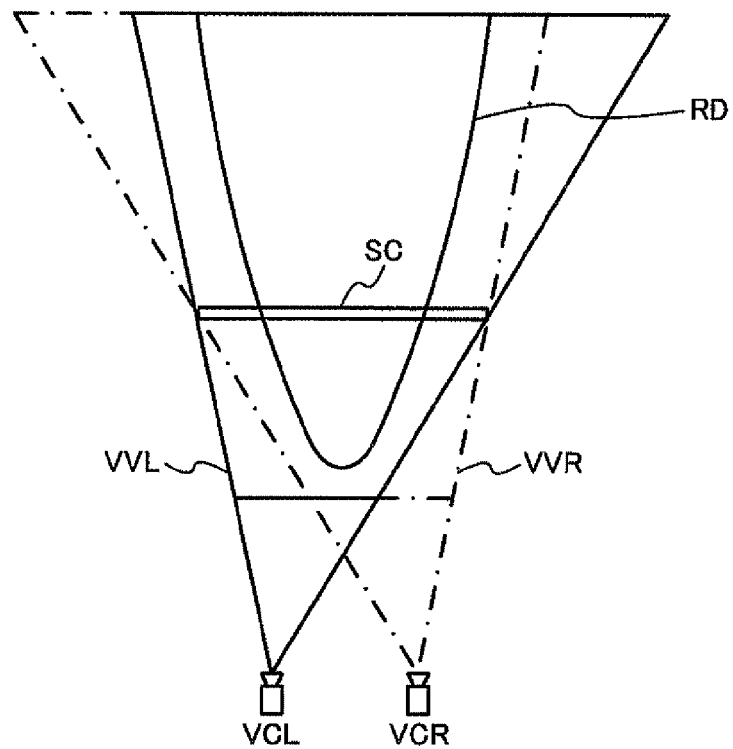
FIGS. 13A and 13B are views illustrative of an inner drawing area setting method.
Figure 13B:
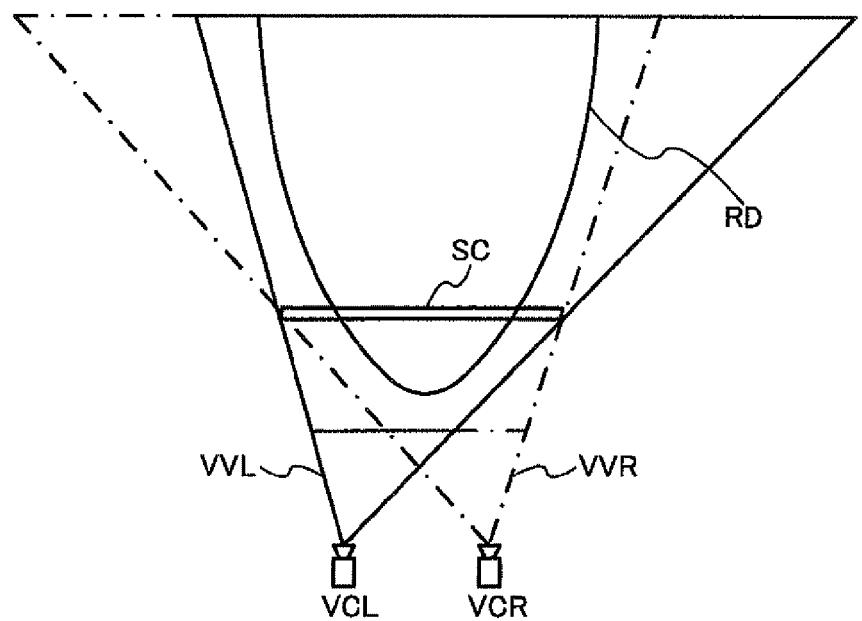
Figure 14A:
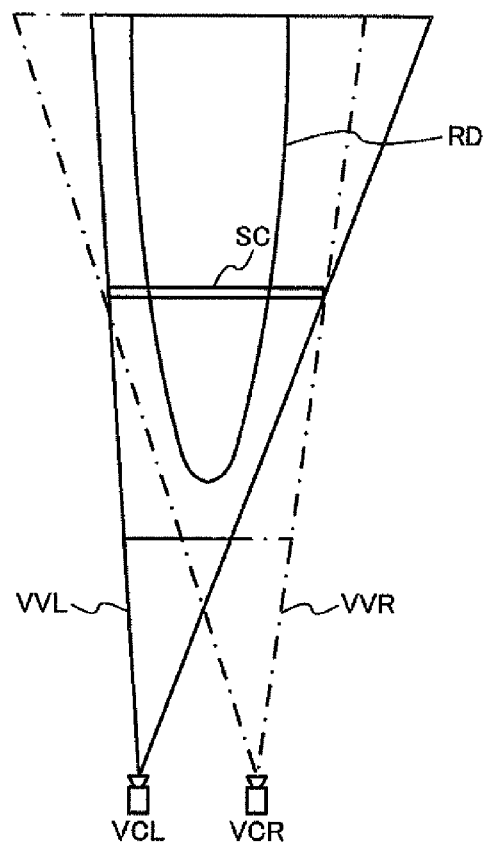
FIGS. 14A and 14B are views illustrative of an inner drawing area setting method.

For example, when each eye of the player is present at a standard position from the screen of the display section 190, the left-eye view volume VVL and the right-eye view volume VVR are set as shown in FIG. 13A. When the player has approached the display section 190 so that each eye of the player is present close to the screen of the display section 190, the left-eye view volume VVL and the right-eye view volume VVR are set as shown in FIG. 13B. When the player has moved away from the display section 190 so that each eye of the player is present away from the screen of the display section 190, the left-eye view volume VVL and the right-eye view volume VVR are set as shown in FIG. 14A. Specifically, the shape of the common area of the left-eye view volume VVL and the right-eye view volume VVR changes corresponding to a change in the setting of the left-eye view volume VVL and the right-eye view volume VVR, as shown in FIGS. 13A, 13B, and 14A.

Figure 14B:
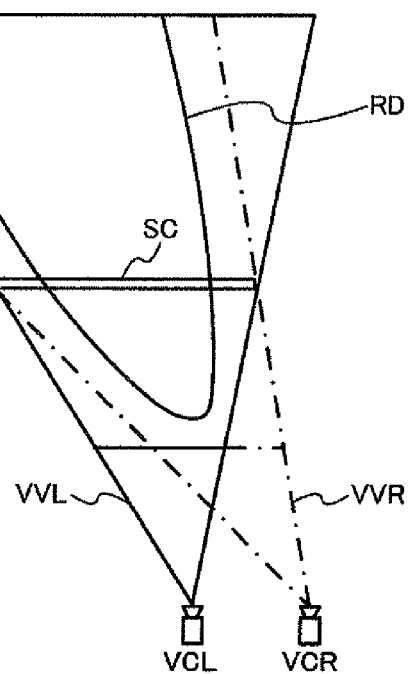

When the player is positioned diagonally with respect to the display section 190, the left-eye view volume VVL and the right-eye view volume VVR are set as shown in FIG. 14B, and the shape of the common area of the left-eye view volume VVL and the right-eye view volume VVR changes accordingly.

In one embodiment of the invention, the shape of the inner drawing area RD within the common area is changed as shown in FIGS. 13A to 14B corresponding to a change in the shape of the common area of the left-eye view volume VVL and the right-eye view volume VVR based on the binocular tracking method or the like. The drawing process that changes the display state (e.g., transparency) of the object in a direction from the inner drawing area RD (for which the shape has been set as described above) toward an area outside the inner drawing area RD is performed as described with reference to FIG. 4 and the like to generate a left-eye image and a right-eye image.

This makes it possible to set an optimum inner drawing area RD corresponding to the position and the direction of the left-eye view volume VVL and the position and the direction of the right-eye view volume VVR even when the position and the direction of the left-eye view volume VVL and the position and the direction of the right-eye view volume VVR have changed in real time due to the binocular tracking method or the like, so that the left-eye image and the right-eye image can be generated such that the display state of the object changes in an area around the right/left edge (side) of the screen (see FIG. 7). This makes it possible to generate a left-eye image and a right-eye image in real time corresponding to a change in position of the left eye and the right eye of the player, and prevent a situation in which an inconsistent (unnatural) image that is observed in a different way depending on the eye of the player is generated.

The shape of the inner drawing area RD may be changed corresponding to a change in the shape of the common area of the view volumes by a method that utilizes a free-form surface (e.g., Bezier surface, B-spline surface, or NURBS surface). Specifically, the inner drawing area RD is formed by a free-form surface, and the vertex of the common area is set as a control point for the free-form surface. The shape of the inner drawing area RD formed by the free-form surface is changed using the vertex of the common area as the control point. For example, an affine transformation process is performed on the control point (i.e., the vertex of the common area), and each point of the free-form surface is calculated based on the control point subjected to the affine transformation process and a coefficient matrix (blending function coefficient matrix) included in the free-form surface (NURBS) object data (see JP-A-2001-218977, for example). This makes it possible to change the shape of the inner drawing area RD using a known free-form surface technique as disclosed in JP-A-2001-218977 or the like, and generate the left-eye image and the right-eye image.

Note that the shape of the inner drawing area may be set corresponding to a change in the shape of the common area by a method other than the method using a free-form surface. For example, the inner drawing area may be set by performing a scaling process on the common area. Specifically, the scaling process that reduces the size of the common area is performed, and the resulting area is set as the inner drawing area. This makes it possible to set the inner drawing area by a simple and low-load process as compared with the case of using a free-form surface.

Although FIGS. 13A to 14B and the like illustrate an example in which the shape of the common area changes corresponding to a change in position and direction of the left-eye virtual camera and the right-eye virtual camera based on the binocular tracking method (described later), and the shape of the inner drawing area RD is changed corresponding to the change in the shape of the common area, the method according to one embodiment of the invention is not limited thereto. For example, when the shape of the common area has changed corresponding to the operation information about the player, the game situation, or the like, the shape of the inner drawing area RD may be changed corresponding to the change in the shape of the common area.

Alternatively, when the shape of the common area has changed as shown in FIGS. 13A and 13B due to a zoom-out operation or a zoom-in operation, the shape of the inner drawing area RD may be changed corresponding to the change in the shape of the common area, and the display state of the object may be changed as described with reference to FIG. 4 and the like. Alternatively, when the shape of the common area has changed as shown in FIGS. 14A and 14B due to the game situation that changes corresponding to an operation performed by the player or the like, the shape of the inner drawing area RD may be changed corresponding to the change in the shape of the common area, and the display state of the object may be changed as described with reference to FIG. 4 and the like. Note that the inter-camera distance may be adjusted in synchronization with a zooming operation. Although a change in the inter-camera distance is not illustrated in FIGS. 13A and 13B, the inter-camera distance may be adjusted, and the shape of the common area may be changed while reflecting a change in shape of each view volume (view frustum) due to the adjustment of the inter-camera distance.

2.4 Binocular Tracking

A binocular tracking method according to one embodiment of the invention is described in detail below. The binocular tracking method according to one embodiment of the invention is implemented by acquiring the position information about the left eye and the right eye of the player, and setting the left-eye view volume and the right-eye view volume based on the acquired position information. A normal head tracking method detects the position of the head of the player, and sets the position and the direction of the virtual camera, for example. The binocular tracking method according to one embodiment of the invention detects the positions of the left eye and the right eye of the player, and sets the position and the direction of each of the left-eye view volume and the right-eye view volume.

The positions of the left eye and the right eye of the player may be detected by various methods. For example, the positions of the left eye and the right eye of the player may be detected by performing an eye tracking process using the imaging section (camera).

Figure 15A:
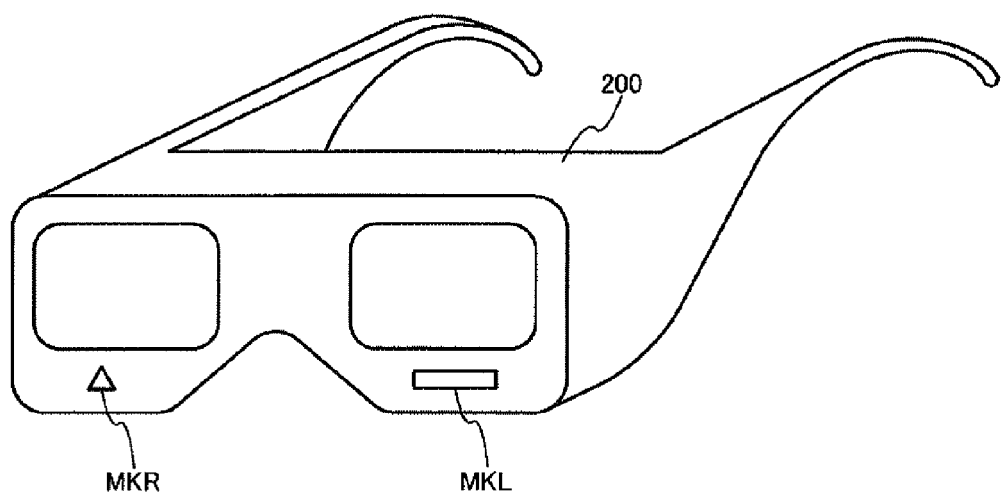
FIGS. 15A and 15B are views illustrative of a method that acquires position information about the left eye and the right eye of the player.

Alternatively, glasses 200 (wearable member in a broad sense) shown in FIG. 15A are provided, and a left-eye marker MKL corresponding to the left eye of the player and a right-eye marker MKR corresponding to the right eye of the player are provided to the glasses 200. Specifically, the left-eye marker MKL is provided to the glasses 200 at a position corresponding to the left-eye part, and the right-eye marker MKR is provided to the glasses 200 at a position corresponding to the right-eye part. The left-eye marker MKL and the right-eye marker MKR differ in shape.

Figure 15B:
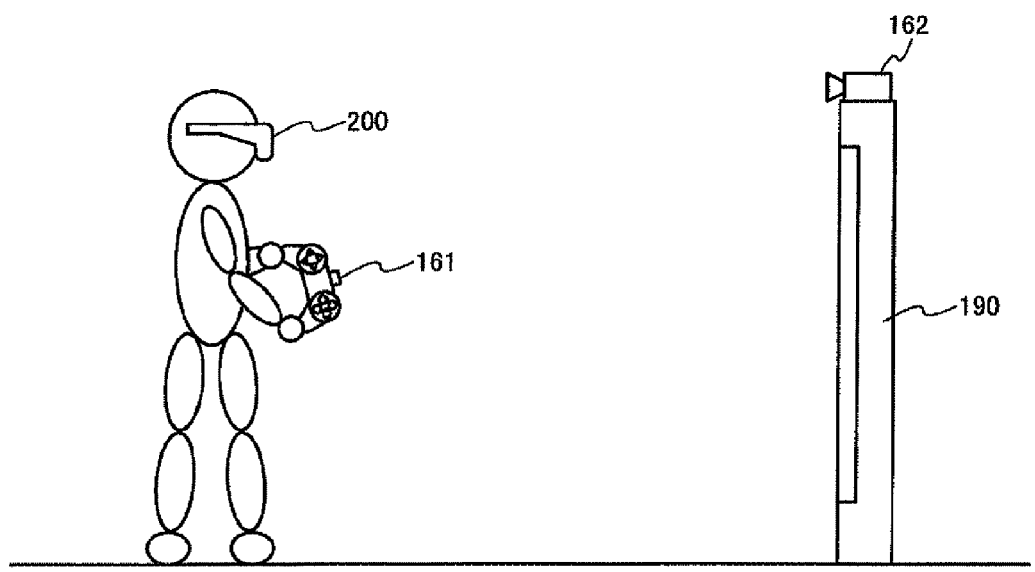

As shown in FIG. 15B, the position information about the left eye and the right eye of the player is acquired based on the imaging information from the imaging section 162 that images the glasses 200 (recognition member) worn by the player. Specifically, the imaging section 162 that images the player from the display section 190 is provided. The player is imaged using the imaging section 162, and the shape of the left-eye marker MKL and the shape of the right-eye marker MKR (see FIG. 15A) are recognized by performing an image recognition process on the imaging information. The positions of the left eye and the right eye of the player when viewed from the display section 190 are detected based on the image recognition results.

The left-eye virtual camera VCL and the right-eye virtual camera VCR are set based on the detected positions of the left eye and the right eye of the player, and the left-eye view volume VVL and the right-eye view volume VVR are set as shown in FIGS. 13A to 14B. The drawing process as described with reference to FIGS. 4 to 12B and the like is then performed to generate the left-eye image and the right-eye image shown in FIG. 7. This makes it possible to track the positions of the left eye and the right eye of the player, and provide the player with a stereoscopic image that changes in real time.

Note that the binocular tracking method according to one embodiment of the invention makes it possible to generate a wide variety of images as compared with the head tracking method that generates an image by detecting the position of the head.

In FIG. 14B in which the player is positioned diagonally with respect to the display section 190, the line-of-sight direction is orthogonal to the screen of the display section 190.

Figure 16A:
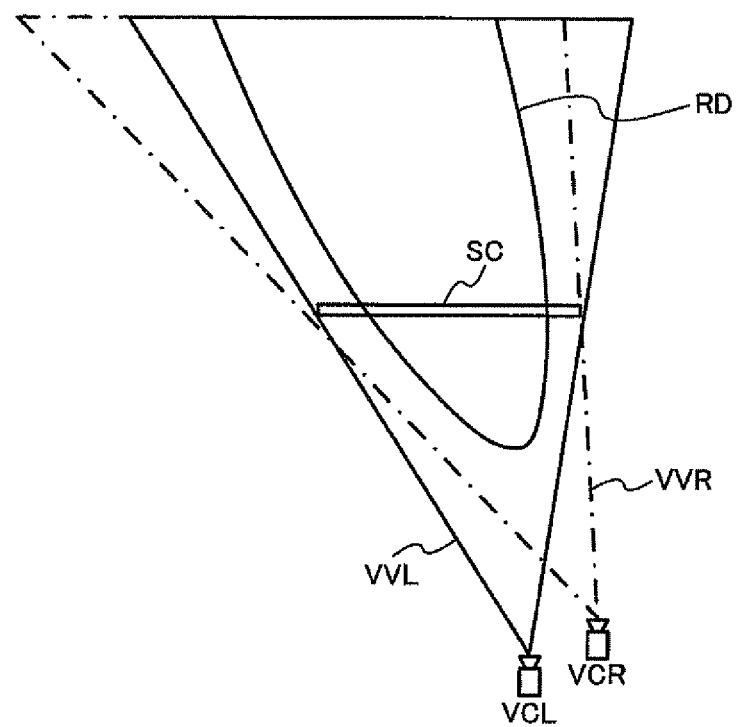
FIGS. 16A and 16B are views illustrative of a view volume setting method based on position information about the left eye and the right eye of the player.

When using the binocular tracking method according to one embodiment of the invention, even if the line-of-sight direction of the player is diagonal to the screen of the display section 190 (see FIG. 16B), the left-eye view volume VVL and the right-eye view volume VVR can be set corresponding to the line-of-sight direction of the player, and the right-eye image and the left-eye image can be generated. Therefore, an image generated when the player faces in the forward direction (FIG. 14B) differs from an image generated when the player faces in the diagonal direction (FIG. 16A). This makes it possible to provide a stereoscopic image that more realistically reflects the motion of the player.

Figure 16B:
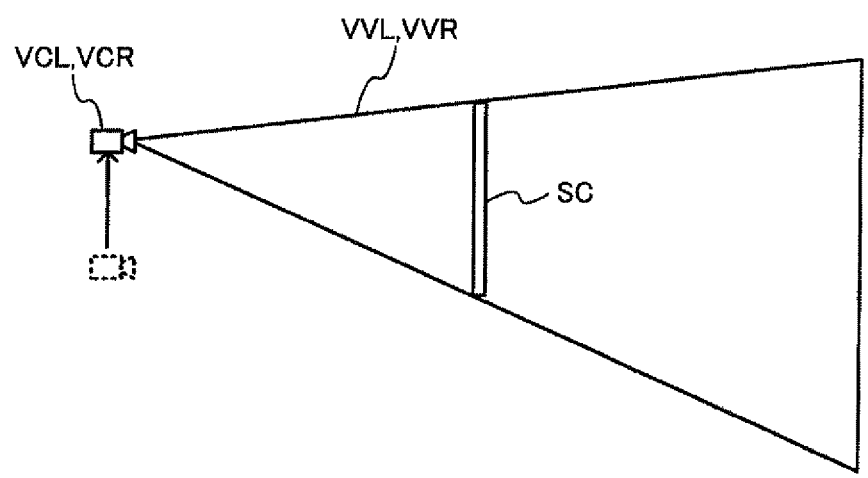
Figure 17:
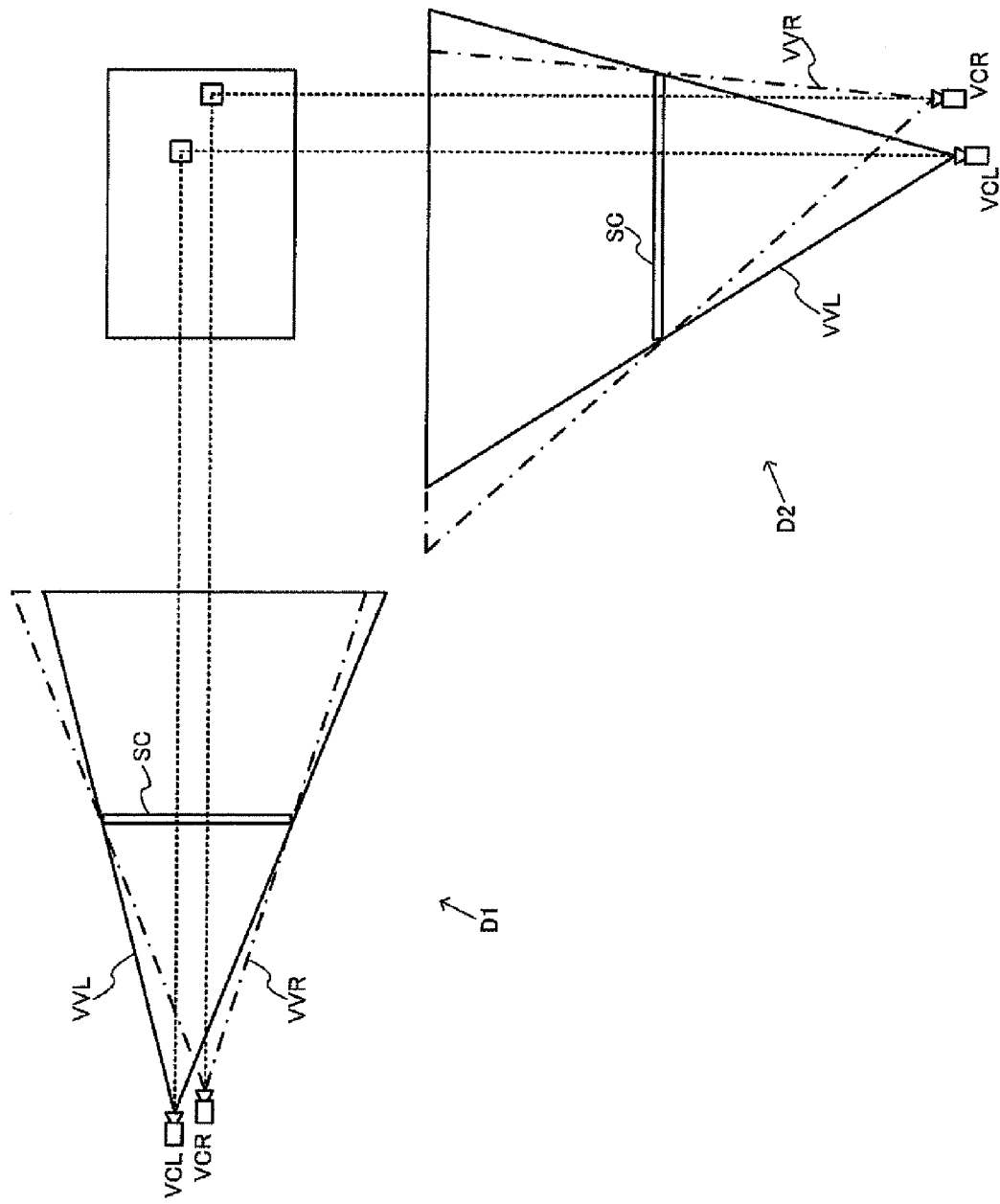
FIG. 17 is a view illustrative of a view volume setting method based on position information about the left eye and the right eye of the player.

Moreover, it is possible to generate an image that reflects a change in viewpoint in the vertical direction relative to the screen of the display section 190 (see FIG. 16B). It is also possible to generate an image that reflects a three-dimensional skew relationship between the positions of the left eye and the right eye of the player (see FIG. 17). Therefore, a stereoscopic image that more realistically reflects the eye motion of the player can be generated as compared with the head tracking method. Note that reference symbol D1 in FIG. 17 indicates a right side view of the left-eye virtual camera VCL and the right-eye virtual camera VCR, and reference symbol D2 in FIG. 17 indicates a top view of the left-eye virtual camera VCL and the right-eye virtual camera VCR.

In one embodiment of the invention, the distance information about the distance between the left eye and the right eye of the player may be acquired, the inter-camera distance between the left-eye virtual camera and the right-eye virtual camera may be set based on the acquired distance information, and the left-eye view volume and the right-eye view volume may be set.

Specifically, an adjustment mechanism 210 (see FIG. 18) for adjusting the distance between the left-eye part and the right-eye part is provided to the glasses 200. A mechanism that utilizes an adjustment screw, a mechanism that utilizes a slide member, or the like may be used as the adjustment mechanism 210. The distance between the left-eye marker MKL provided corresponding to the left-eye part of the glasses 200 and the right-eye marker MKR provided corresponding to the right-eye part of the glasses 200 changes when the distance between the left-eye part and the right-eye part is changed by an adjustment using the adjustment mechanism 210. Therefore, the distance between the left-eye marker MKL and the right-eye marker MKR also changes in an image captured using the imaging section 162 (see FIG. 15B). Accordingly, the distance information about the distance between the left eye and the right eye of the player can be acquired based on the imaging information about the left-eye marker MKL and the right-eye marker MKR.

Figure 19A:
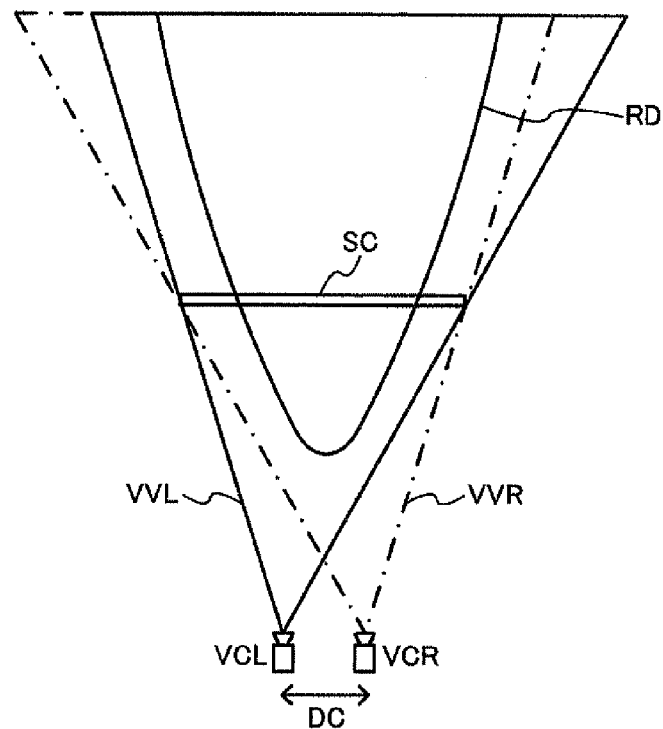
FIGS. 19A and 19B are views illustrative of an inter-camera distance setting method based on position information about the left eye and the right eye of the player.
Figure 19B:
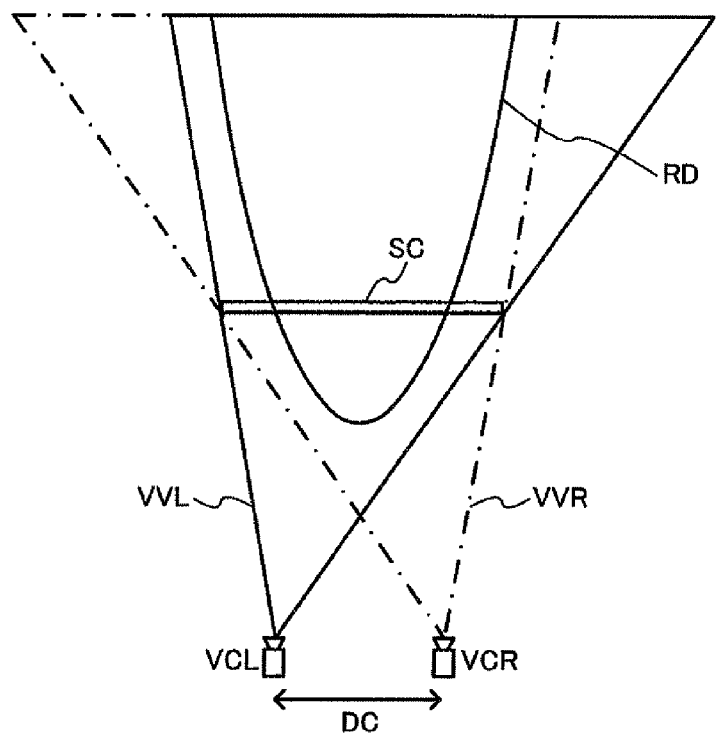

As shown in FIGS. 19A and 19B, the inter-camera distance DC between the left-eye virtual camera VCL and the right-eye virtual camera VCR is set based on the acquired distance information, and the left-eye view volume VVL and the right-eye view volume VVR are set. FIG. 19A shows an example in which the inter-camera distance DC between the left-eye virtual camera VCL and the right-eye virtual camera VCR is set to a small value since it has detected that the distance between the left eye and the right eye of the player is short. FIG. 19B shows an example in which the inter-camera distance DC between the left-eye virtual camera VCL and the right-eye virtual camera VCR is set to a large value since it has detected that the distance between the left eye and the right eye of the player is long.

For example, when a child who is considered to have a short eye-to-eye distance plays the game, the left-eye view volume VVL and the right-eye view volume VVR are set as shown in FIG. 19A, and a stereoscopic image is generated. On the other hand, when an adult who is considered to have an eye-to-eye distance longer than that of a child plays the game, the left-eye view volume VVL and the right-eye view volume VVR are set as shown in FIG. 19B, and a stereoscopic image is generated. This makes it possible to reflect an individual variation in the eye-to-eye distance of the player, so that a stereoscopic image can be provided at an inter-camera distance appropriate for each player.

Figure 18:
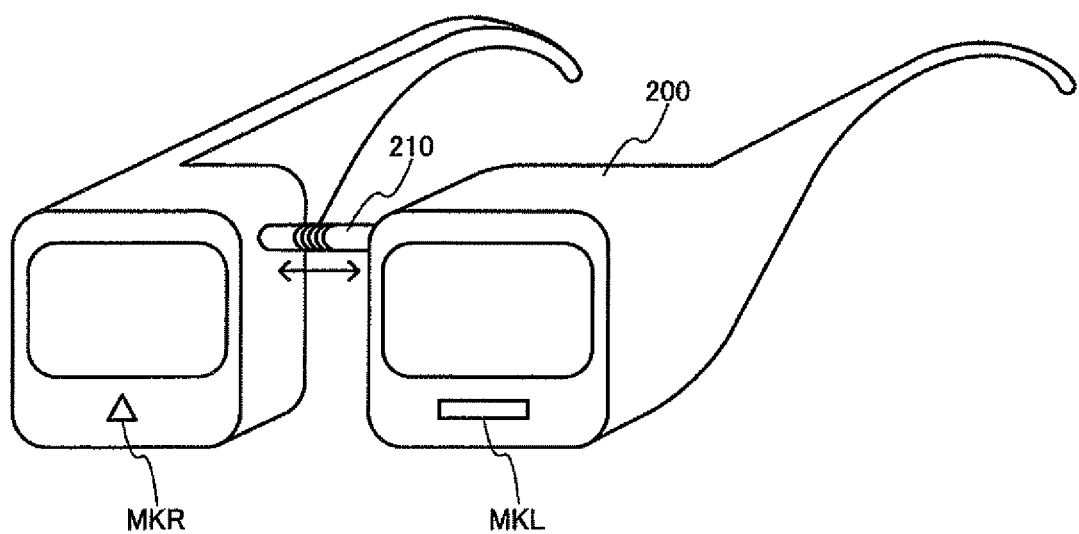
FIG. 18 shows an example of glasses having an adjustment mechanism used to adjust the distance between a left-eye part and a right-eye part.

Although FIGS. 15A and 18 illustrate an example in which the recognition member worn by the player is the glasses 200, the recognition member is not limited thereto. Various modifications may be made as long as at least the positions of the left eye and the right eye of the player can be recognized using the recognition member. Note that an eyeglass-type recognition member has an advantage in that glasses provided with a liquid crystal shutter for implementing stereovision can be used as the recognition member. The position information about the left eye and the right eye of the player may be directly detected by an eye tracking process using the imaging section 162 or the like instead of using the left-eye marker MKL and the right-eye marker MKR shown in FIGS. 15A and 18.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., glasses, left-eye image, right-eye image, left-eye view volume, right-eye view volume, left-eye virtual camera, or right-eye virtual camera) cited with a different term (e.g., recognition member, first-viewpoint image, second-viewpoint image, first-viewpoint view volume, second-viewpoint view volume, first viewpoint, or second viewpoint) having a broader meaning or the same meaning at least once in the specification and the drawings may be replaced by the different term in any place in the specification and the drawings. The view volume setting process, the object drawing process, the inner drawing area setting process, and the like are not limited to those described in connection with the above embodiments. Methods equivalent to the above methods are included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, and a mobile phone.

The methods according to the embodiments of the invention may also be applied to the stereoscopic image generation method disclosed in JP-A-2004-178581, for example. In the stereoscopic image generation method disclosed in JP-A-2004-178581, a left-eye image is generated using a view volume VVL set corresponding to a left-eye virtual camera VCL, and a right-eye image is generated using a view volume VVR set corresponding to a right-eye virtual camera VCL (see FIG. 20). Stereovision is implemented by the left-eye image and the right-eye image, and the player observes the stereoscopic image from a left-eye viewpoint VPL and a right-eye viewpoint VPR shown in FIG. 20B. This makes it possible to implement more natural stereovision with reduced inconsistency in focus adjustment and depth.

Figures 20A, 20B:
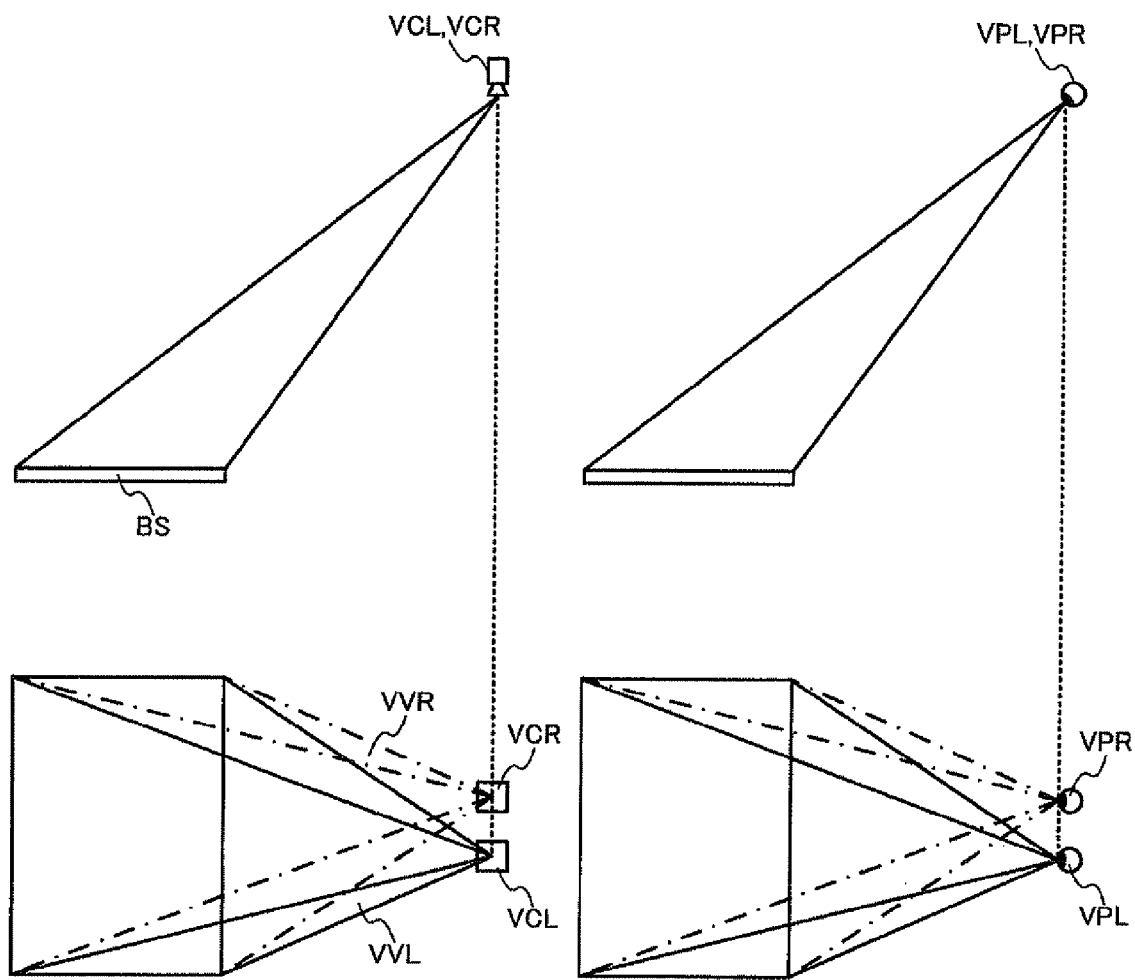
FIGS. 20A and 20B are views illustrative of a stereoscopic image generation method to which a method according to one embodiment of the invention is applied.

When using the stereoscopic image generation method shown in FIG. 20A, a left-eye image and a right-eye image may be generated by applying the methods according to the embodiments of the invention so that the display state of the object changes in a direction from an inner drawing area within the common area of the left-eye view volume VVL and the right-eye view volume VVR toward an area outside the inner drawing area. In this case, the stereoscopic image generation method may be dynamically switched between the normal method shown in FIG. 13A and the method shown in FIG. 20A. For example, a stereoscopic image may be generated by the method shown in FIG. 13A in a mode in which the line of sight of the player is orthogonal to the screen, and may be generated by the method shown in FIG. 20A in a mode in which the line of sight of the player is diagonal to the screen (see FIG. 20B). These methods may be instantaneously switched, or may be gradually changed so that the camera gradually moves.

Although an example in which the methods according to the embodiments of the invention are applied to binocular stereovision has been described above, the methods according to the embodiments of the invention may also applied to multi-view stereovision, integral imaging stereovision, and the like. Multi-view stereovision is implemented by a discrete multi-view stereoscopic method that makes it possible to implement stereovision from arbitrary viewpoints of the player (observer). For example, stereovision at an arbitrary viewpoint is implemented by providing a plurality of viewpoint images (parallax images), and allowing the player to observe viewpoint images among the plurality of viewpoint images corresponding to the viewpoint positions of the player with the left eye and the right eye. Such multi-view stereovision may be implemented by a stereoscopic method using an optical element (e.g., parallax barrier or lenticular lens), or the like. Integral imaging stereovision is implemented by a stereoscopic method that makes it possible to implement stereovision from a continuous (indiscrete) viewpoint (i.e., a specific viewpoint is not used). A fractional view method, an integral imaging method, a super multi-view method, and the like have been known as a method that implements integral imaging stereovision.

Figure 21:
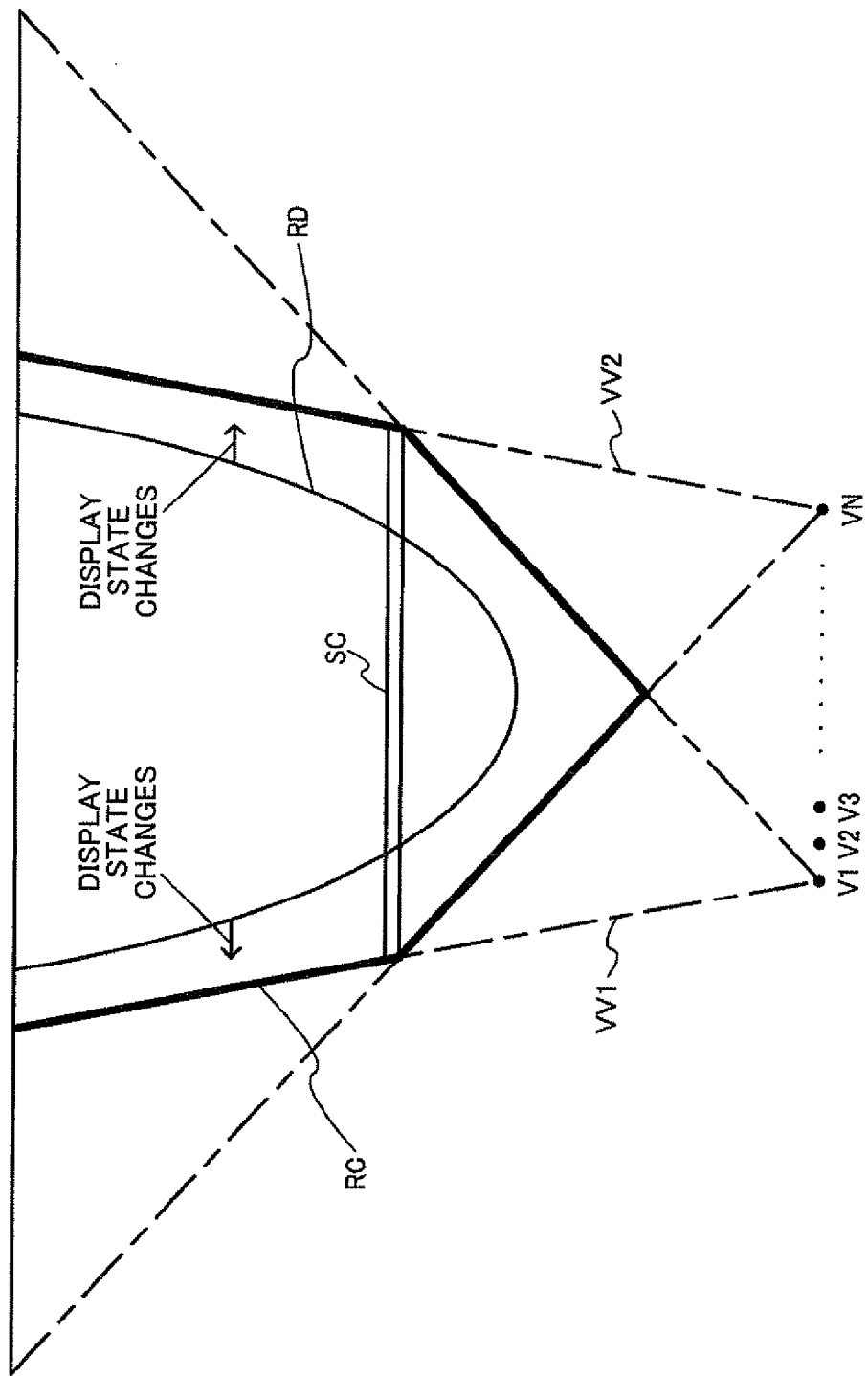

FIG. 21 shows an example in which the method according to one embodiment of the invention is applied to multi-view stereovision or the like. For example, when implementing multi-view stereovision, the leftmost viewpoint V1 among a plurality of viewpoints V1 to VN may be used as the first viewpoint, and the rightmost viewpoint VN may be used as the second viewpoint. Therefore, the common area (common frame area) of a view volume VV1 corresponding to the first viewpoint V1 and a view volume VV2 corresponding to the second viewpoint VN is an area RC (non-frame violation area) enclosed by the bold line in FIG. 21.

In this case, the drawing process that changes the display state of the object in a direction from an inner drawing area RD within the common area RC of the view volumes VV1 and VV2 toward an area outside the inner drawing area RD is performed to generate stereoscopic images (first-viewpoint image and second-viewpoint image). This makes it possible to suppress a situation in which the player is given a wrong impression when implementing multi-view stereovision. This also applies to the case of implementing integral imaging stereovision. However, when the observation area (turn-around range) displayed at the same time is large (wide) when implementing multi-view stereovision or integral imaging stereovision, the common area (non-frame violation area) may be very small (narrow). In this case, two viewpoints positioned on the inner side of the leftmost and rightmost viewpoints (e.g., the position of each eye when the player is positioned directly in front of the screen) may be used as the first viewpoint V1 and the second viewpoint V2.

When the positional relationship information about the viewpoint of the player and the screen can be detected by the eye tracking process or the like, the viewpoints may be selected based on the positional relationship information, and the drawing process that changes the display state of the object may be performed.

Figure 22:
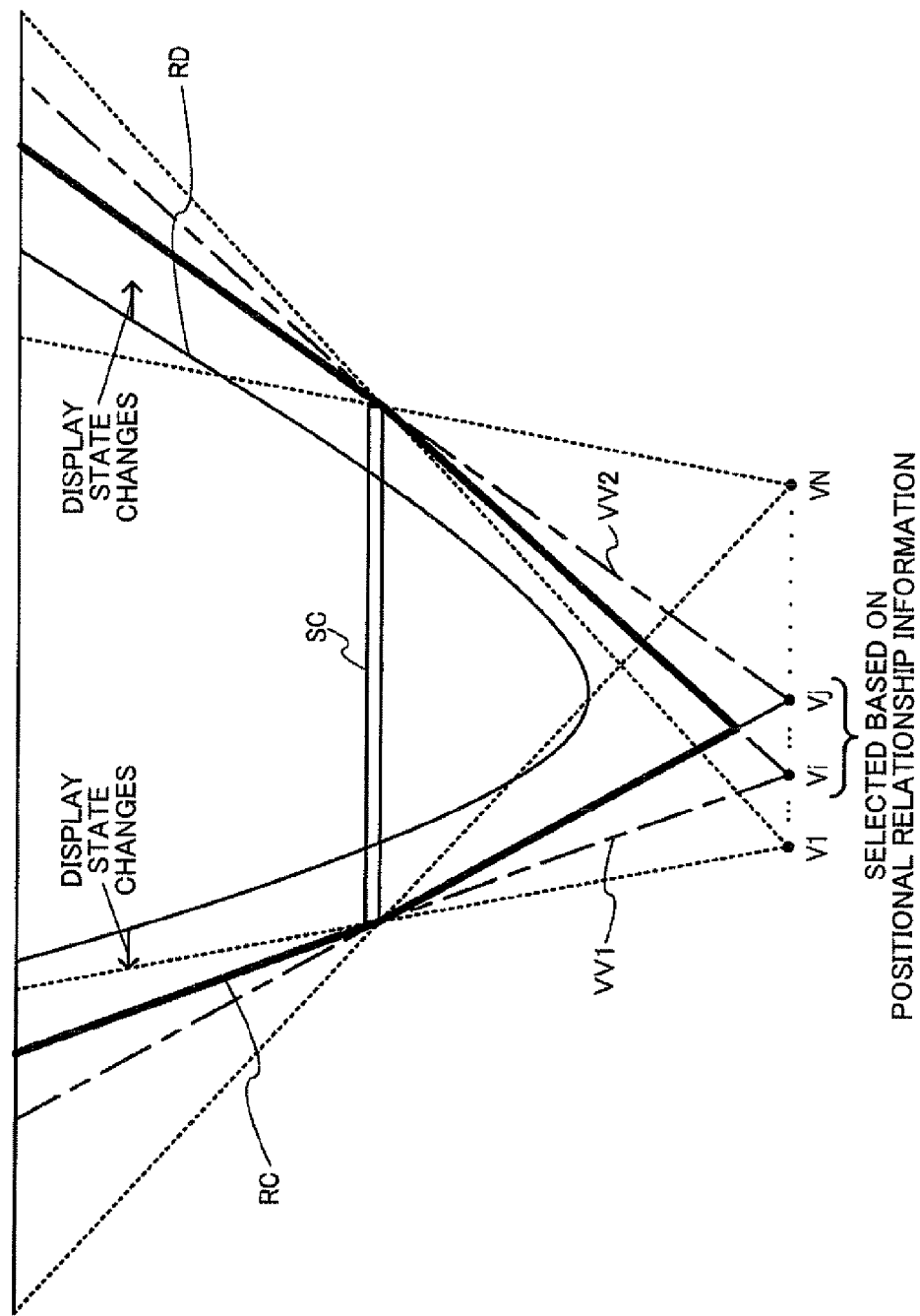

In FIG. 22, the positional relationship information about the screen of the display section and the player (observer) has been acquired, and a first viewpoint Vi and a second viewpoint Vj (that implement multi-view stereovision or integral imaging stereovision) corresponding to the left eye and the right eye of the player have been selected based on the acquired positional relationship information, for example. A first-viewpoint image viewed from the first viewpoint Vi and a second-viewpoint image viewed from the second viewpoint Vj are generated as stereoscopic images observed by the player with the left eye and the right eye.

In FIG. 22, the drawing process that changes the display state of the object in a direction from an inner drawing area RD within a common area RC of a view volume VV1 corresponding to the first viewpoint Vi selected based on the positional relationship information and a view volume VV2 corresponding to the second viewpoint Vj selected based on the positional relationship information toward an area outside the inner drawing area RD is performed to generate stereoscopic images.

This makes it possible to set an optimum common area RC corresponding to the viewpoint position of the player when implementing multi-view stereovision or integral imaging stereovision, and generate a stereoscopic image so that the display state of the object changes in a direction from the inner drawing area RD within the common area RC toward an area outside the inner drawing area RD. This enables optimum stereoscopic display of the object when implementing multi-view stereovision or integral imaging stereovision.

Although FIGS. 18 to 20B illustrate an example in which the position information about the left eye and the right eye of the player is acquired as the eye tracking process for selecting the viewpoint when implementing multi-view stereovision or integral imaging stereovision, the methods according to the embodiments of the invention are not limited thereto. For example, the position of the head of the player may be detected by a normal head tracking process, and the viewpoint may be selected. The eye tracking method is not limited to the method shown in FIGS. 18 to 20B. For example, the positions of the left eye and the right eye of the player may be detected by performing a normal eye tracking process using the imaging section (camera).

What is claimed is:

1. An image generation system comprising:
   a memory; and
   at least one processor that is configured to:
      set an object space in which a plurality of objects are disposed;
      acquire position information of a left-eye and a right-eye of a player by detecting using a binocular tracking process; and
      generate a first-viewpoint image, based on the acquired position information of the left-eye of the player, viewed from a first viewpoint in the object space, and a second-viewpoint image, based on the acquired position information of the right-eye of the player, viewed from a second viewpoint in the object space, the first viewpoint and the second viewpoint implementing stereovision, wherein
         a drawing process to generate the first-viewpoint image and the second-viewpoint image changes display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint, a position and a direction of the first-viewpoint view volume and a position and a direction of the second-viewpoint view volume changing corresponding to a change in position of the left eye and the right eye of the player acquired by the binocular tracking process so that the shape of the inner drawing area changes corresponding to the change in position of the left eye and the right eye of the player, and the drawing process is such that the drawing process:
(i) causes the object to be gradually defocused in a direction from the inner drawing area toward an area outside the inner drawing area to generate the first-viewpoint image and the second-viewpoint image; and
(ii) gradually changes the display state of the object from the inner drawing area within the common area toward a clipping plane of the common area to generate the first-viewpoint image and the second-viewpoint image.

2. The image generation system as defined in claim 1, the processor further configured to:
acquire color information about an area around a screen of a display section when viewed from a player, an image being displayed on the screen of the display section, and set the target color based on the acquired color information.

3. The image generation system as defined in claim 1, the processor further configured to: obtain a first-viewpoint vertex screen position that is a position of a vertex of the object on a screen within the first-viewpoint view volume, obtain a second-viewpoint vertex screen position that is a position of the vertex of the object on the screen within the second-viewpoint view volume, and perform the drawing process that changes the display state of the object based on the first-viewpoint vertex screen position and the second-viewpoint vertex screen position to generate the first-viewpoint image and the second-viewpoint image.

4. The image generation system as defined in claim 3, the processor further configured to: obtain a first $\alpha$-value that is set corresponding to a distance between the first-viewpoint vertex screen position and a right/left side of the screen, obtain a second $\alpha$-value that is set corresponding to a distance between the second-viewpoint vertex screen position and the right/left side of the screen, set an $\alpha$-value of the vertex of the object based on the first $\alpha$-value and the second $\alpha$-value, and generate the first-viewpoint image and the second-viewpoint image.

5. The image generation system as defined in claim 1, the processor further configured to:
set the inner drawing area within the common area of the first-viewpoint view volume and the second-viewpoint view volume, and
change a shape of the inner drawing area according to a change in shape of the common area.

6. The image generation system as defined in claim 5, the processor further configured to: change the shape of the inner drawing area formed by a free-form surface using a vertex of the common area as a control point.

7. The image generation system as defined in claim 1, the processor further configured to:
acquire position information about a left eye and a right eye of a player; and set the first-viewpoint view volume and the second-viewpoint view volume based on the acquired position information.

8. The image generation system as defined in claim 7, the processor further configured to:
provide a left-eye marker corresponding to the left eye of the player and a right-eye marker corresponding to the right eye of the player to a recognition member worn by the player, and
acquire the position information about the left eye and the right eye of the player based on imaging information that images the recognition member worn by the player.

9. The image generation system as defined in claim 7, the processor further configured to:
acquire distance information about a distance between the left eye and the right eye of the player, and
set an inter-viewpoint distance between the first viewpoint and the second viewpoint based on the acquired distance information, and set the first-viewpoint view volume and the second-viewpoint view volume.

10. The image generation system as defined in claim 9, the recognition member being glasses having an adjustment mechanism for adjusting a distance between a left-eye part and a right-eye part, and
the processor further configured to: acquire the distance information about the distance between the left eye and the right eye of the player based on imaging information about a left-eye marker provided to the left-eye part of the glasses and a right-eye marker provided to the right-eye part of the glasses.

11. An image generation system comprising:
a memory; and
at least one processor that is configured to:
set an object space in which a plurality of objects are disposed; and
generate a first-viewpoint image viewed from a first viewpoint in the object space, and a second-viewpoint image viewed from a second viewpoint in the object space, the first viewpoint and the second viewpoint implementing stereovision, wherein
a drawing process to generate the first-viewpoint image and the second-viewpoint image changes a display state of an object as a distance from a right/left side of a screen decreases, the object being perspectively projected onto the screen, and
the drawing process:
(i) causes the object to be gradually defocused in a direction from the inner drawing area toward an area outside the inner drawing area to generate the first-viewpoint image and the second-viewpoint image;
(ii) gradually changes the display state of the object from the inner drawing area within the common area toward a clipping plane of the common area to generate the first-viewpoint image and the second-viewpoint image;
(iii) includes:
obtaining a first-viewpoint vertex screen position that is a position of a vertex of the object on a screen within the first-viewpoint view volume
obtaining a second-viewpoint vertex screen position that is a position of the vertex of the object on the screen within the second-viewpoint view volume,
obtaining a first $\alpha$-value that is set corresponding to a distance between a first-viewpoint vertex screen position and a right/left side of the screen, obtaining a second α-value that is set corresponding to a distance between the second-viewpoint vertex screen position and the right/left side of the screen, and setting the first α-value or the second α-value that is closer to transparent to be a α-value of the vertex of the object.

12. The image generation system as defined in claim 1,
the first viewpoint and the second viewpoint respectively being a viewpoint of a left-eye virtual camera and a viewpoint of a right-eye virtual camera that implement binocular stereovision.

13. The image generation system as defined in claim 11,
the first viewpoint and the second viewpoint respectively being a viewpoint of a left-eye virtual camera and a viewpoint of a right-eye virtual camera that implement binocular stereovision.

14. The image generation system as defined in claim 1,
the first viewpoint and the second viewpoint being two viewpoints among a plurality of viewpoints that implement multi-view stereovision, or two arbitrary viewpoints within an observation range that is set to implement integral imaging stereovision.

15. The image generation system as defined in claim 11,
the first viewpoint and the second viewpoint being two viewpoints among a plurality of viewpoints that implement multi-view stereovision, or two arbitrary viewpoints within an observation range that is set to implement integral imaging stereovision.

16. The image generation system as defined in claim 14, the processor further configured to:
acquire positional relationship information about a screen of a display section and a player; and
select the first viewpoint and the second viewpoint that implement the multi-view stereovision or the integral imaging stereovision based on the acquired positional relationship information.

17. The image generation system as defined in claim 15, the processor further configured to:
acquire positional relationship information about a screen of a display section and a player; and
select the first viewpoint and the second viewpoint that implement the multi-view stereovision or the integral imaging stereovision based on the acquired positional relationship information.

18. An image generation method comprising:
setting an object space in which a plurality of objects are disposed;
acquiring position information of a left-eye and a right-eye of a player by detecting using a binocular tracking process; and
generating a first-viewpoint image, based on the acquired position information of the left-eye of the player, viewed from a first viewpoint in the object space, and a second-viewpoint image, based on the acquired position information of the right-eye of the player, viewed from a second viewpoint in the object space, the first viewpoint and the second viewpoint implementing stereovision, wherein
a drawing process to generate the first-viewpoint image and the second-viewpoint image changes, the drawing process changing a display state of an object in a direction from an inner drawing area toward an area outside the inner drawing area, the inner drawing area being positioned within a common area of a first-viewpoint view volume corresponding to the first viewpoint and a second-viewpoint view volume corresponding to the second viewpoint, a position and a direction of the first-viewpoint view volume and a position and a direction of the second-viewpoint view volume changing corresponding to a change in position of the left eye and the right eye of the player acquired by the binocular tracking process so that the shape of the inner drawing area changes corresponding to the change in position of the left eye and the right eye of the player, and
the drawing process is such that the drawing process:
(i) causes the object to be gradually defocused in a direction from the inner drawing area toward an area outside the inner drawing area to generate the first-viewpoint image and the second-viewpoint image; and
(ii) gradually changes the display state of the object from the inner drawing area within the common area toward a clipping plane of the common area to generate the first-viewpoint image and the second-viewpoint image.

19. An image generation method comprising:
setting an object space in which a plurality of objects are disposed; and
generating a first-viewpoint image viewed from a first viewpoint in the object space, and a second-viewpoint image viewed from a second viewpoint in the object space, the first viewpoint and the second viewpoint generated based on the α-value of the vertex and implementing stereovision, wherein
a drawing process to generate the first-viewpoint image and the second-viewpoint image changes a display state of an object as a distance from a right/left side of a screen decreases, the object being perspectively projected onto the screen; and
the drawing process is such that the drawing process:
(i) causes the object to be gradually defocused in a direction from the inner drawing area toward an area outside the inner drawing area to generate the first-viewpoint image and the second-viewpoint image;
(ii) gradually changes the display state of the object from the inner drawing area within the common area toward a clipping plane of the common area to generate the first-viewpoint image and the second-viewpoint image; and
(iii) includes:
obtaining a first-viewpoint vertex screen position that is a position of a vertex of the object on a screen within the first-viewpoint view volume,
obtaining a second-viewpoint vertex screen position that is a position of the vertex of the object on the screen within the second-viewpoint view volume,
obtaining a first α-value that is set corresponding to a distance between a first-viewpoint vertex screen position and a right/left side of the screen,
obtaining a second α-value that is set corresponding to a distance between the second-viewpoint vertex screen position and the right/left side of the screen, and
setting the first α-value or the second α-value that is closer to transparent to be a α-value of the vertex of the object.

20. A non-transitory computer-readable information storage medium storing a program that causes a computer to execute the image generation method as defined in claim 18.

21. A non-transitory computer-readable information storage medium storing a program that causes a computer to execute the image generation method as defined in claim 19.

* * * * *